(12) United States Patent
Mei et al.

(10) Patent No.: US 11,777,406 B2
(45) Date of Patent: Oct. 3, 2023

(54) MULTIPHASE SWITCHED MODE POWER SUPPLY CLOCKING CIRCUITS AND RELATED METHODS

(71) Applicant: Texas Instruments Incorporated, Dallas, TX (US)

(72) Inventors: Tawen Mei, Sunnyvale, CA (US); Karen Huimun Chan, South San Francisco, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/572,062

(22) Filed: Jan. 10, 2022

(65) Prior Publication Data

US 2022/0131465 A1    Apr. 28, 2022

Related U.S. Application Data

(63) Continuation of application No. 16/413,305, filed on May 15, 2019, now Pat. No. 11,251,706.

(51) Int. Cl.
*H02M 3/158* (2006.01)
*H02M 3/335* (2006.01)
*H04L 7/00* (2006.01)

(52) U.S. Cl.
CPC ..... *H02M 3/1582* (2013.01); *H02M 3/33507* (2013.01); *H04L 7/0079* (2013.01)

(58) Field of Classification Search
CPC ... H02M 3/1582; H02M 3/33507; H03L 7/10; H04L 2027/0036; H04L 2027/0057

USPC ................. 375/326, 328; 329/310, 341–343; 370/395.62

See application file for complete search history.

(56) References Cited

U.S. PATENT DOCUMENTS

| | | | |
|---|---|---|---|
| 6,356,566 B1 * | 3/2002 | Lee | H04J 3/0685 |
| | | | 713/400 |
| 7,366,267 B1 | 4/2008 | Lee et al. | |
| 2003/0095009 A1 * | 5/2003 | Gomm | H03L 7/087 |
| | | | 331/57 |
| 2004/0252704 A1 * | 12/2004 | Ruat | G06F 13/385 |
| | | | 370/395.62 |
| 2009/0251226 A1 | 10/2009 | Kathuria et al. | |
| 2011/0057735 A1 | 3/2011 | Honda | |
| 2011/0170323 A1 | 7/2011 | Fulcher et al. | |
| 2014/0035642 A1 | 2/2014 | Venkata et al. | |
| 2016/0301519 A1 | 10/2016 | Sengoku | |
| 2017/0272231 A1 | 9/2017 | Chen | |
| 2017/0288684 A1 | 10/2017 | Ogihara | |
| 2017/0300080 A1 | 10/2017 | Jain et al. | |
| 2019/0097544 A1 | 3/2019 | Albertini et al. | |
| 2020/0174105 A1 | 6/2020 | Yin et al. | |

* cited by examiner

*Primary Examiner* — Young T. Tse
(74) *Attorney, Agent, or Firm* — Ray A. King; Frank D. Cimino

(57) ABSTRACT

Multiphase switched mode power supply clock apparatus, systems, articles of manufacture, and related methods are disclosed. An example apparatus includes a first clock recovery circuit to in response to obtaining a first clock pulse, transmit the first clock pulse to a power converter to cause the power converter to switch based on the first clock pulse, in response to obtaining a second clock pulse after the first clock pulse re-transmit the second clock pulse to a second clock recovery circuit, and increment a count value, and in response to the count value meeting a phase selection value, reset the count value.

18 Claims, 10 Drawing Sheets

MULTIPHASE SWITCHED MODE POWER SUPPLY CLOCKING CIRCUITS AND RELATED METHODS

CROSS REFERENCE TO RELATED APPLICATIONS

This application is a Continuation application of U.S. patent application Ser. No. 16/413,305 filed May 15, 2019, which application is hereby incorporated herein by reference herein in its entirety.

FIELD OF THE DISCLOSURE

This disclosure relates generally to power converters and, more particularly, to multiphase switched mode power supply clocking circuits and related methods.

BACKGROUND

A power converter is a circuit that is used in various devices to convert an input voltage to a desired output voltage. For example, a buck converter converts an input voltage into a lower output voltage by controlling transistors and/or switches to charge and/or discharge inductors and/or capacitors to maintain the desired output voltage. When power converters are arranged in a stack configuration, one of the power converters may generate a clock signal to synchronize power switching operations of the remaining power converters.

Figure 1:
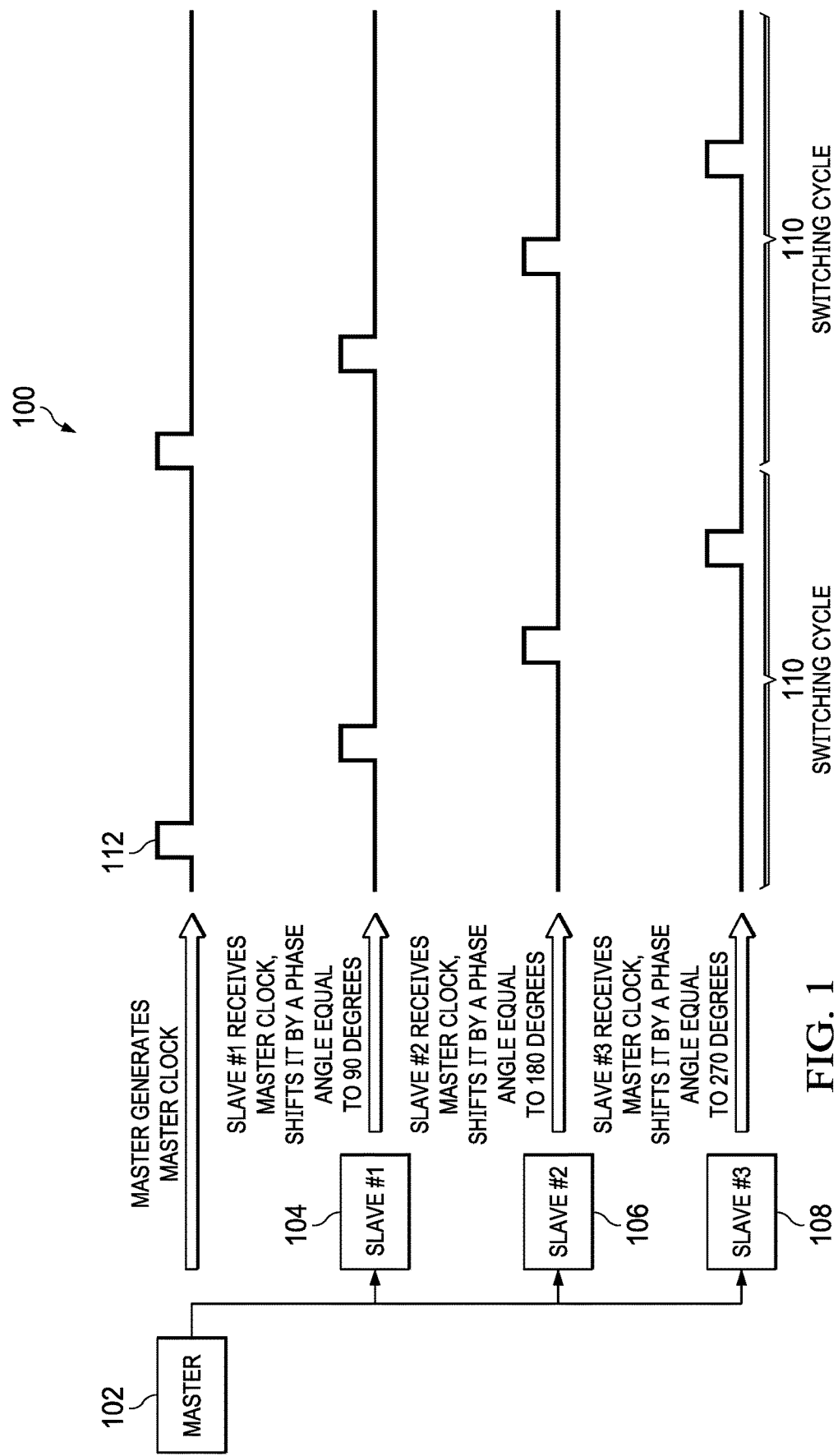
FIG. 1 is a schematic illustration of a first clock pulse propagation sequence for integrated devices arranged in a stack configuration.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A switched mode power supply (SMPS) is a power conversion system including one or more switched mode power converters (e.g., a boost converter, a buck converter, a buck-boost converter, etc.) to convert a first voltage (e.g., an input voltage) to a second voltage (e.g., an output voltage). Multiple switched mode power converters may be connected, or stacked, together in a multiphase configuration to form a multiphase power conversion system. In such a configuration, the multiple phases of the SMPS can provide more power to a load compared to a single phase SMPS including only one switched mode power converter.

Some multiphase power conversion systems include a master phase and one or more slave phases. The master phase may correspond to a first device configured as a master (e.g., a master IC, a master power converter, a master integrated device, etc.) and the one or more slave phases may correspond to one or more second devices configured as slaves (e.g., a slave IC, a slave power converter, a slave integrated device, etc.). Conventionally, when the master phase and the slave phase(s) are in a stacked configuration, the master phase generates a clock pulse, or clock signal, and directly passes the clock pulse to each slave phase.

In some instances, slave phases receive the clock pulse and use a phase-locked loop (PLL) to generate respective slave clock pulses spaced at phase intervals equal to 360 degrees divided by N with respect to the master phase, where N is a quantity of the master phase and the slave phases, and N−1 is the quantity of the slave phase(s). Such a clock pulse propagation scheme from the master to the slaves may be sufficient when the SMPS is switching in continuous conduction mode (CCM) because the clock frequency of the master is within an operating range of the PLL.

However, such a clock pulse propagation scheme may not be sufficient when the SMPS is switching in a pulse-frequency modulation (PFM) mode. When operating in the PFM mode, the master phase can generate clock pulses at substantially lower frequencies than the frequency of clock pulses generated in the CCM mode. For example, the SMPS may boost efficiency by reducing the switching frequency and, thus, the master phase may reduce the clock pulse frequency accordingly. As the clock pulse frequency decreases in PFM mode, the PLL may fail to lock because the clock pulse frequency may fall below a gain bandwidth of the PLL set by the PLL compensation network. Additionally, in some instances, at such low clock pulse frequencies, the PLL may fail to operate due to leakages due to parasitic capacitances inherent in the SMPS.

Examples disclosed herein include SMPS clock recovery circuits and related methods to interleave the master and slave clock phases at substantially equal-spaced intervals during both CCM and PFM operation. In some disclosed examples, a master integrated device generates clock pulses for the master integrated device and for one or more slave integrated devices of the SMPS. For example, the master integrated device and the slave integrated devices can be daisy chained in succession. Each switching cycle, the master integrated device switches based on a first one of N generated clock pulses and transmits the remaining N−1 clock pulses to a first slave integrated device. The first slave integrated device accepts the N−1 clock pulses, switches based on a first one of the N−1 clock pulses, and transmits N−2 clock pulses to a second slave integrated device, etc., until an N−1 slave integrated device receives the last clock pulse.

For example, after the first slave integrated device switches based on a first clock pulse obtained from the master integrated device, the first slave integrated device re-transmits a second clock pulse obtained from the master integrated device to the second slave integrated device. In such examples, the first slave integrated device can re-transmit the second clock pulse by buffering the second clock pulse (e.g., to remove distortion) and passing and/or otherwise re-directing a buffered clock pulse (e.g., a clock pulse with distortion removed) with the same timing as the second clock pulse. As used herein, re-transmitting a clock pulse does not correspond to re-generating a clock pulse but can correspond to buffering a clock pulse, processing the clock pulse (e.g., to remove distortion), and transmitting a buffered and/or processed instance or version of the clock pulse to a different integrated device. In response to generating the third clock pulse, the first slave integrated device transmits the third clock pulse to the second slave integrated device, where the second slave integrated device switches based on the third clock pulse.

Advantageously, by only allowing the master integrated device to generate and/or otherwise determine the timing of the clock pulses, the clock pulse frequency can be reduced to a relatively low-level in PFM operation and the switching behavior between the master integrated device and the one or more slave integrated devices can remain interleaved. In disclosed examples, because the one or more slave integrated devices can switch in response to receiving a first clock pulse of one or more clock pulses instead of phase shifting the first clock pulse, the likelihood of the slave integrated devices missing a switching event is reduced even when operating in PFM mode.

FIG. 1 is a schematic illustration of a first clock pulse propagation sequence 100 for integrated devices 102, 104, 106, 108 arranged in a stack configuration. In FIG. 1, the integrated devices 102, 104, 106, 108 include a master integrated device 102, a first slave integrated device 104, a second slave integrated device 106, and a third slave integrated device 108. The master integrated device 102 includes a power converter (e.g., a buck converter, a boost converter, a buck-boost converter, etc.) configured as a master phase. The slave integrated devices 104, 106, 108 include power converters configured as slave phases.

In FIG. 1, during a first switching cycle 110, the master integrated device 102 generates and transmits a master clock pulse 112 having a first timing (e.g., a first phase angle) to each of the slave integrated devices 104, 106, 108. In response to receiving the master clock pulse 112, each of the slave integrated devices 104, 106, 108 shifts the master clock pulse 112 by a phase angle associated with the slave integrated devices 104, 106, 108. For example, each of the slave integrated devices 104, 106, 108 may shift the master clock pulse 112 by adding and/or otherwise implementing a time delay or a time difference between receiving the master clock pulse 112 and switching to the master clock pulse 112. In FIG. 1, the first slave integrated device 104 obtains the master clock pulse 112 having the first phase angle and shifts the master clock pulse 112 by a second phase angle equal to 90 degrees. The power converter of the first slave integrated device 104 switches to the master clock pulse shifted by the second phase angle. In FIG. 1, the second slave integrated device 106 shifts the master clock pulse 112 by a third phase angle equal to 180 degrees and the third slave integrated device 108 shifts the master clock pulse 112 by a fourth phase angle equal to 270 degrees.

Accordingly, each of the slave integrated devices 104, 106, 108 of FIG. 1 switches out-of-phase from the master integrated device 102 by shifting the master clock pulse 112 by a corresponding phase angle. In FIG. 1, the slave integrated devices 104, 106, 108 determine the timing of switching events for the power converters of the slave integrated devices 104, 106, 108. However, during PFM operation, the master integrated device 102 may generate the master clock pulse 112 at a frequency that is below a gain bandwidth of a PLL of the slave integrated devices 104, 106, 108 that may cause the PLL to not lock and, thus, may cause one or more of the slave integrated devices 104, 106, 108 to miss a switching cycle. Disadvantageously, by allowing the slave integrated devices 104, 106, 108 instead of the master integrated device 102 of FIG. 1 to determine the timing of power converter switching events, the first clock pulse propagation sequence 100 of FIG. 1 may reduce an efficiency of a SMPS including the integrated devices 102, 104, 106, 108 of FIG. 1.

Figure 2:
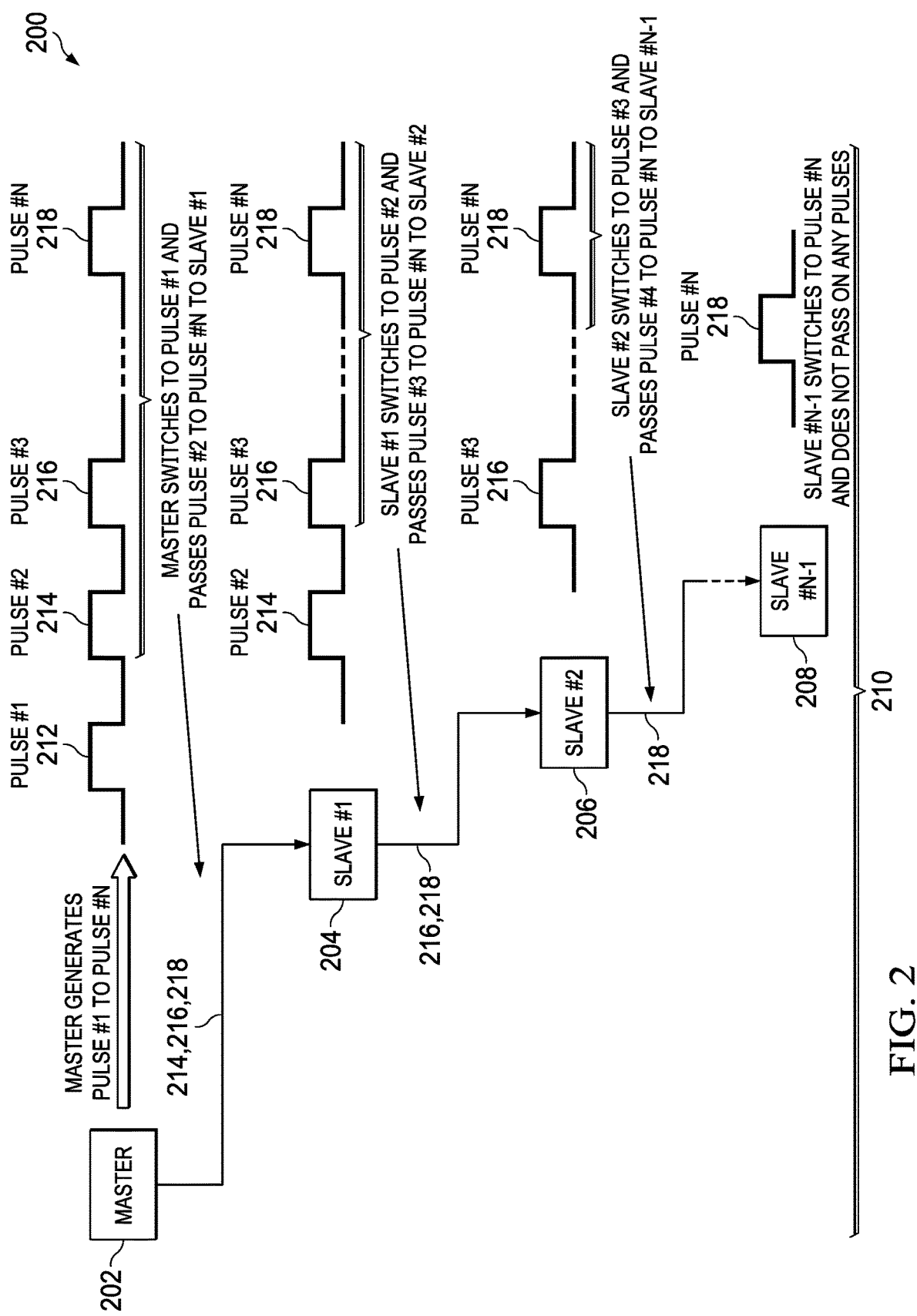
FIG. 2 is a schematic illustration of an example clock pulse propagation sequence for example integrated devices arranged in a stack configuration.

FIG. 2 is a schematic illustration of an example clock pulse propagation sequence 200 for example integrated devices 202, 204, 206, 208 arranged in a stack configuration. In FIG. 2, the integrated devices 202, 204, 206, 208 include an example master integrated device 202, a first example slave integrated device 204, a second example slave integrated device 206, and a third example slave integrated device 208. Additionally or alternatively, there may be fewer or more slave integrated devices 204, 206, 208 than depicted in FIG. 2. The master integrated device 202 includes a power converter (e.g., a direct current (DC)/DC converter, a buck converter, a boost converter, a buck-boost converter, etc.) configured as a master phase. The slave integrated devices 204, 206, 208 include a power converter configured as a slave phase.

In the illustrated example of FIG. 2, during an example switching cycle 210, the master integrated device 202 generates a plurality of example clock pulses 212, 214, 216, 218 including a first example clock pulse (PULSE #1) 212, a second example clock pulse (PULSE #2) 214, a third example clock pulse (PULSE #3) 216, and a fourth example clock pulse (PULSE #N) 218, where the fourth clock pulse 218 is an N clock pulse. Additionally or alternatively, the master integrated device 202 may generate fewer or more clock pulses 212, 214, 216, 218 than depicted in FIG. 2.

In the illustrated example of FIG. 2, the master integrated device 202 switches to the first clock pulse 212 and transmits the second through fourth clock pulses 214, 216, 218 to the first slave integrated device 204. When the first slave integrated device 204 obtains the second through fourth clock pulses 214, 216, 218, the first slave integrated device 204 switches to the second clock pulse 214 and re-transmits the third and fourth clock pulses 216, 218 to the second slave integrated device 206. For example, the first slave integrated device 204 can receive the second clock pulse 214 by buffering the second clock pulse 214 with amplification to remove distortion. The first slave integrated device 204 may switch to, or switch based on, the second clock pulse 214 by switching or turning on one or more switches (e.g., a transistor, a metal-oxide semiconductor field-effect transistor (MOSFET), a bipolar junction transistor (BJT), etc.) of the first slave integrated device 204 in response to obtaining the second clock pulse 214. In such examples, a power converter of the first slave integrated device 204 can switch based on the second clock pulse 214 by operating and/or otherwise acting upon receipt of the second clock pulse 214.

In the illustrated example of FIG. 2, the first slave integrated device 204 re-transmits the third and fourth clock pulses 216, 218 to the second slave integrated device 206. For example, the first slave integrated device 204 can re-transmit the third clock pulse 216 by buffering the third clock pulse 216, amplifying the buffered clock pulse, and transmitting the amplified clock pulse to the second slave integrated device 206. In such examples, the first slave integrated device 204 does not re-generate the third clock pulse 216. The clock pulse transmitted from the first slave integrated device 204 to the second slave integrated device 206 is different from the third clock pulse 216 in that the clock pulse is not passively re-directed without processing, but the clock pulse has substantially the same amplitude, timing, waveform shape, etc., as the third clock pulse 216. For example, the first slave integrated device 204 can re-transmit the third clock pulse 216 to the second slave integrated device 206 by generating and transmitting a clock pulse having substantially the same electrical characteristics and/or parameters as the third clock pulse 216.

In the illustrated example of FIG. 2, when the second slave integrated device 206 obtains the third and fourth clock pulses 216, 218 (e.g., clock pulses having substantially similar electrical characteristics as the third and fourth clock pulses 216, 218 generated by the master integrated device 202), the second slave integrated device 206 switches to the third clock pulse 216 and transmits (e.g., re-transmits) the fourth clock pulse 218 to the third slave integrated device 208. In such examples, the second slave integrated device 206 does not re-generate the fourth clock pulse 216. When the third slave integrated device 208 obtains the fourth clock pulse 218, the third slave integrated device 208 switches to the fourth clock pulse 218 and does not transmit a clock pulse to another integrated device. After the third slave integrated device 208 switches to the fourth clock pulse 218, the master integrated device 202 can repeat the clock pulse propagation sequence of 200 of FIG. 2 by generating another set of clock pulses (e.g., the clock pulses 212, 214, 216, 218).

Figure 3:
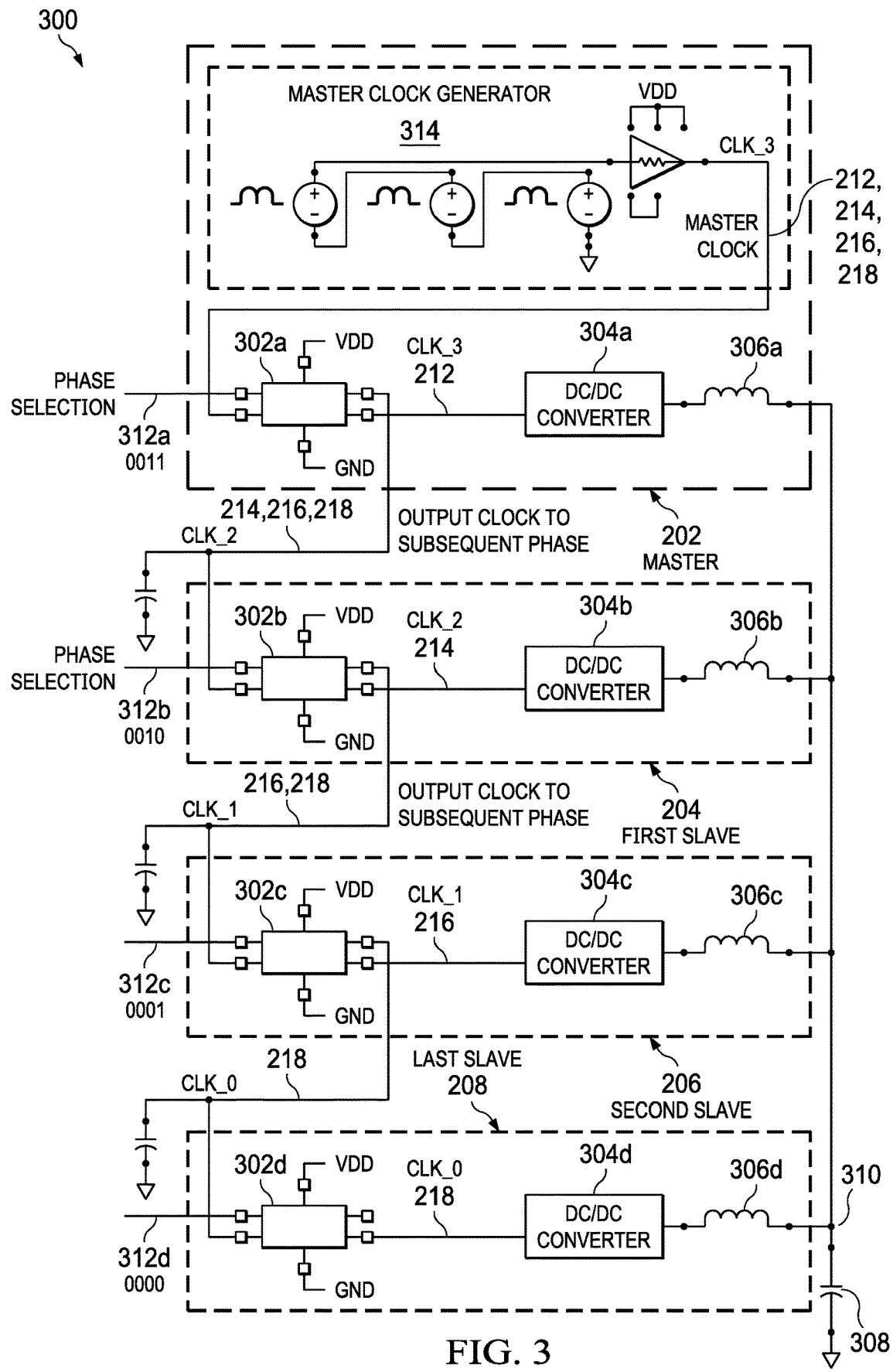
FIG. 3 is a schematic illustration of an example switched mode power conversion system including clock recovery circuits to implement the example clock pulse propagation sequence of FIG. 2.

FIG. 3 is a schematic illustration of an example switched mode power conversion system 300 including example clock recovery circuits 302a-d to implement the clock pulse propagation sequence 200 of FIG. 2. In FIG. 3, the switched mode power conversion system 300 is a SMPS. The switched mode power conversion system 300 includes the master integrated device 202 and the slave integrated devices 204, 206, 208 of FIG. 2. In FIG. 3, each of the integrated devices 202, 204, 206, 208 includes a respective one of the clock recovery circuits 302a-d and a respective one of example power converters 304a-d. In FIG. 3, the power converters 304a-d are DC/DC converters, such as a boost converter, a buck converter, a buck-boost converter, etc.

In the illustrated example of FIG. 3, each of the clock recovery circuits 302a-d is coupled to a respective one of the power converters 304a-d. In FIG. 3, each of the power converters 304a-d is coupled to a respective one of example inductors 306a-d. In FIG. 3, the inductors 306a-d are coupled to each other and to an example capacitor 308 at an example output node 310. For example, a load can be coupled to the switched mode power conversion system 300 at the output node 310.

In the illustrated example of FIG. 3, each of the clock recovery circuits 302a-d is coupled to a respective one of example phase selection inputs 312a-d. The phase selection inputs 312a-d correspond to electrical connections (e.g., integrated circuit pins) that can facilitate delivery of electrical signals that can be interpreted by the integrated devices 202, 204, 206, 208 as phase selection values. In FIG. 3, the phase selection inputs 312a-d include four electrical connections represented by inputs A<0:3> of the clock recovery circuits 302a-d. Alternatively, the phase selection inputs 312a-d may include and/or otherwise correspond to a different quantity of electrical connections. In FIG. 3, the phase selection inputs 312a-d are supplied externally. In other examples, the phase selection inputs 312a-d can be internally programmed. In FIG. 3, a first phase selection input 312a to the first clock recovery circuit 302a corresponds to and/or otherwise has a value (e.g., a bit value, a phase selection value, etc.) of '0011', a second phase selection input 312b to the second clock recovery circuit 302b has a value of '0010', a third phase selection input 312c to the third clock recovery circuit 302c has a value of '0001', and a fourth phase selection input 312d to the fourth clock recovery circuit 302d has a value of '0000'. Alternatively, one or more of the phase selection inputs 312a-d may have any other suitable value.

In the illustrated example of FIG. 3, one or more of the clock recovery circuits 302a-d obtain one or more clock pulses 212, 214, 216, 218 and count a quantity of the one or more clock pulses 212, 214, 216, 218 re-transmitted to a different one of the clock recovery circuits 302a-d. When the count, or count value, is zero (e.g., '0000' for a 4-bit counter), the clock recovery circuits 302a-d pass a clock pulse received at a clock input (CLKIN) to a respective one of power converters 304a-d via a clock recovery (CLKREC) output. After the initial clock pulse is passed and until the count equals a value of a corresponding one of the phase selection inputs 312a-d, the clock recovery circuits 302a-d re-transmit clock pulses received at CLKIN to another one of the clock recovery circuits 302a-d via a clock output (CLKOUT).

In the illustrated example of FIG. 3, the first clock recovery circuit 302a passes the first clock pulse 212 received at CLKIN to the first power converter 304a via CLKREC to cause the first power converter 304a to switch based on the first clock pulse 212. In response to the passing, the first clock recovery circuit 302a increments a count from '0000' to '0001'. In response to the first clock recovery circuit 302a obtaining the second clock pulse 214 and the count for the first clock recovery circuit 302a being different from '0000', the first clock recovery circuit 302a re-transmits the second clock pulse 214 from CLKOUT to CLKIN of the second clock recovery circuit 302b.

In response to the second clock recovery circuit 302b obtaining the second clock pulse 214 from the first clock recovery circuit 302a and the count associated with the second clock recovery circuit 302*b* being '0000', the second clock recovery circuit 302*b* passes the second clock pulse 214 to the second power converter 304*b*. In response to the passing, the second clock recovery circuit 302*b* adjusts the count from '0000' to '0001'. In response to obtaining the third and fourth clock pulses 216, 218, the second clock recovery circuit 302*b* re-transmits the third clock pulse 216 and the fourth clock pulse 218 from CLKOUT to CLKIN of the third clock recovery circuit 302*c* of the second slave integrated device 206. The second clock recovery circuit 302*b* adjusts the count from '0001' to '0010' after passing the fourth clock pulse 218 to the third clock recovery circuit 302*c*. When the count equals and/or otherwise meets '0010', which corresponds to the value of the second phase selection input 312*b*, the second clock recovery circuit 302*b* resets the counter to reset the count associated with the second clock recovery circuit 302*b*.

In the illustrated example of FIG. 3, the master integrated device 202 includes an example clock generator circuit 314 to generate the clock pulses 212, 214, 216, 218 of FIG. 2. In FIG. 3, the clock generator circuit 314 is an electronic oscillator circuit that produces a clock or timing signal, such as the clock pulses 212, 214, 216, 218 of FIG. 2, for use in synchronizing operation of the switched mode power conversion system 300. For example, the clock generator circuit 314 may be a crystal oscillator circuit, a resonator circuit, a resistor-capacitor (RC) oscillator circuit, or a Silicon oscillator circuit.

In the illustrated example of FIG. 3, an output of the clock generator circuit 314 is coupled to CLKIN of the first clock recovery circuit 302*a*. The first phase selection input 312*a* is coupled to a phase selection input (A<0:3>) of the first clock recovery circuit 302*a*. For example, A<0:3> of the first clock recovery circuit 302*a* has a value of '0011' in FIG. 3. In such examples, the input A<0:3> of the first clock recovery circuit 302*a* can have a logic Low voltage on a first electrical connection A<0>, a logic Low voltage on a second electrical connection A<1>, a logic High voltage on a third electrical connection A<2>, and a logic High voltage on a fourth electrical connection A<3> to generate the value of '0011'. In FIG. 3, CLKREC of the first clock recovery circuit 302*a* is coupled to the first power converter 304*a*. In FIG. 3, CLKOUT of the first clock recovery circuit 302*a* is coupled to CLKIN of the second clock recovery circuit 302*b*.

In operation, the clock generator circuit 314 sequentially generates the clock pulses 212, 214, 216, 218 of FIG. 2 at a clock frequency, which corresponds to a switching frequency of the power converters 304*a*-*d*. The first clock recovery circuit 302*a* of the master integrated device 202 receives the first clock pulse 212 and passes and/or otherwise transmits the first clock pulse 212 to the first power converter 304*a* to cause the first power converter 304*a* to switch based on the first clock pulse 212. The first clock recovery circuit 302*a* receives the second clock pulse 214 after the first clock pulse 212 and re-transmits the second clock pulse 214 to the second clock recovery circuit 302*b*. The first clock recovery circuit 302*a* sequentially receives the third and fourth clock pulses 216, 218 after the second clock pulse 214 and sequentially re-transmits the third and fourth clock pulses 216, 218 to the second clock recovery circuit 302*b*.

In operation, the second clock recovery circuit 302*b* of the first slave integrated device 204 receives the second clock pulse 214 and passes the second clock pulse 214 to the second power converter 304*b* to cause the second power converter 304*b* to switch based on the second clock pulse 214. The second clock recovery circuit 302*b* receives the third and fourth clock pulses 216, 218 after the second clock pulse 214 and re-transmits the third and fourth clock pulses 216, 218 to the third clock recovery circuit 302*c*.

In operation, the third clock recovery circuit 302*c* of the second slave integrated device 206 receives the third clock pulse 216 and passes the third clock pulse 216 to the third power converter 304*c* to cause the third power converter 304*c* to switch based on the third clock pulse 216. The third clock recovery circuit 302*c* receives the fourth clock pulse 218 after the third clock pulse 216 and re-transmits the fourth clock pulse 218 to the fourth clock recovery circuit 302*d*. The fourth clock recovery circuit 302*d* receives the fourth clock pulse 218 and passes the fourth clock pulse 218 to the fourth power converter 304*d* to cause the fourth power converter 304*d* to switch based on the fourth clock pulse 218.

Advantageously, by directing the clock generator circuit 314 to generate the clock pulses 212, 214, 216, 218 for the switched mode power conversion system 300 instead of the slave integrated devices 204, 206, 208, the switching behavior of the master and slave phases of the switched mode power conversion system 300 remain interleaved even when the frequency of the clock pulses 212, 214, 216, 218 reduces to a value in PFM operation below which a PLL may be unable to lock and/or otherwise operate. For example, the SMPS 300 of FIG. 3 improves the first clock pulse propagation sequence 100 of FIG. 1 by instructing the master integrated device 202 to determine the timing for the slave integrated devices 204, 206, 208 (e.g., the switching frequencies of the corresponding power converters 304*b*-*d*) instead of the slave integrated devices 204, 206, 208 determining respective timings of switching operations of the second through fourth power converters 304*b*-*d* by phase shifting clock pulses from the master integrated device 202.

While an example manner of implementing the switched mode power conversion system 300 is illustrated in FIG. 3, one or more of the elements, processes, and/or devices illustrated in FIG. 3 may be combined, divided, re-arranged, omitted, eliminated, and/or implemented in any other way. Further, the example integrated devices 202, 204, 206, 208, the example clock recovery circuits 302*a*-*d*, the example power converters 304*a*-*d*, the example clock generator circuit 314, and/or, more generally, the example switched mode power conversion system 300 of FIG. 3 may be implemented by hardware, software, firmware, and/or any combination of hardware, software, and/or firmware. Thus, for example, any of the example integrated devices 202, 204, 206, 208, the example clock recovery circuits 302*a*-*d*, the example power converters 304*a*-*d*, the example clock generator circuit 314, and/or, more generally, the example switched mode power conversion system 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example integrated devices 202, 204, 206, 208, the example clock recovery circuits 302*a*-*d*, the example power converters 304*a*-*d*, and/or the example clock generator circuit 314 is/are hereby expressly defined to include a non-transitory computer readable storage device or storage disk such as non-volatile memory (e.g., read-only memory (ROM), electrically erasable programmable read-only memory (EEPROM), flash memory, etc.), volatile memory (e.g., Synchronous Dynamic Random Access Memory (SDRAM), Dynamic Random Access Memory (DRAM), etc., and/or any other type of random access memory (RAM) device), etc., including the software and/or firmware. Further still, the example switched mode power conversion system 300 of FIG. 3 may include one or more elements, processes, and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
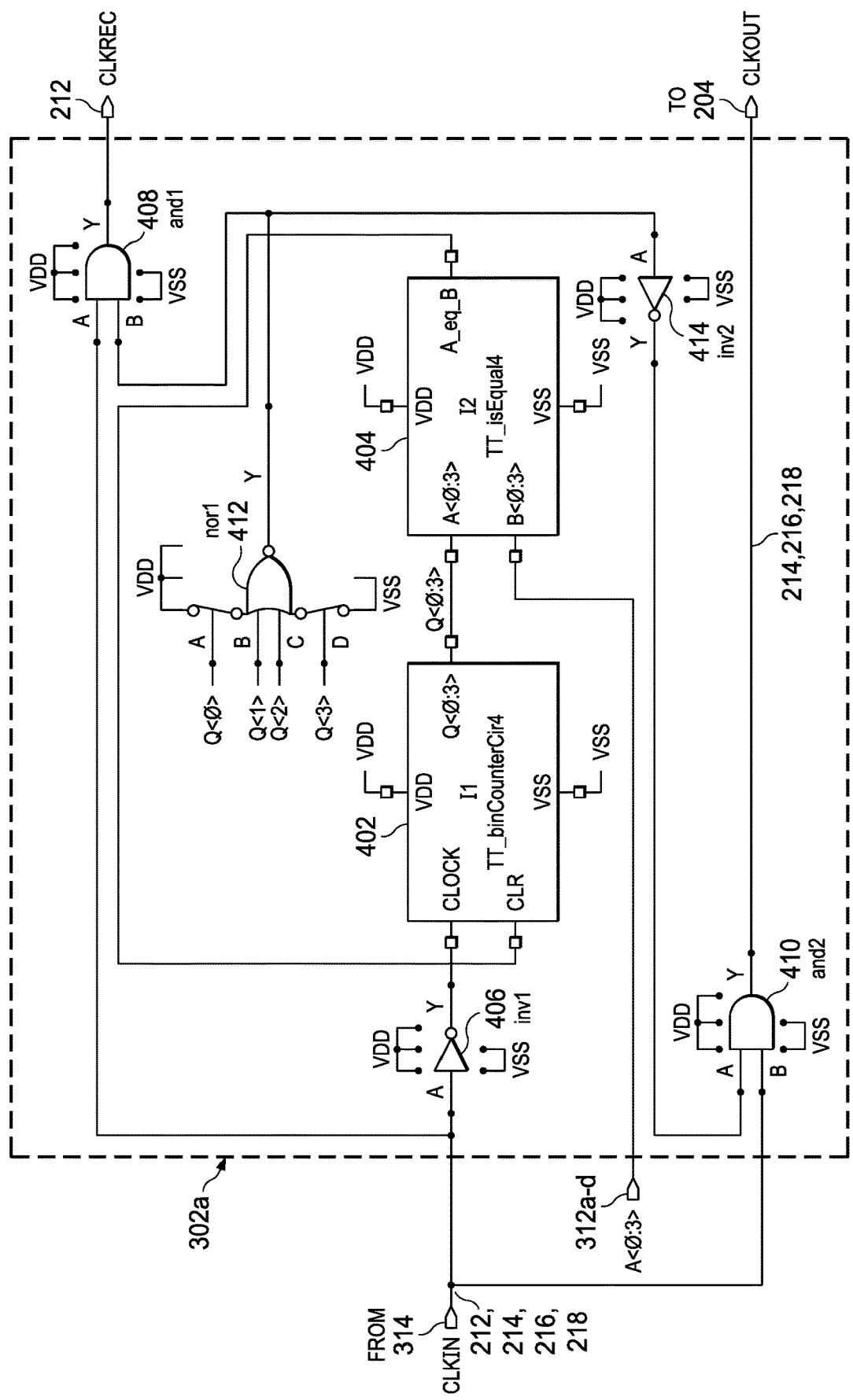
FIG. 4 is a schematic illustration of an example implementation of the clock recovery circuits of FIG. 3 including a counter circuit and a comparator circuit.

FIG. 4 is a schematic illustration of the first clock recovery circuit 302a of FIG. 3. The schematic illustration of FIG. 4 and the description in connection with FIG. 4 can also be applicable to the second, third, and/or fourth clock recovery circuits 302b-d of FIG. 3. In FIG. 4, the first clock recovery circuit 302a includes an example counter circuit 402 and an example comparator circuit 404. The counter circuit 402 counts and/or otherwise determines a count, or a quantity of the clock pulses 212, 214, 216, 218 transmitted (e.g., re-transmitted) to a different one of the clock recovery circuits 302b-d. The comparator circuit 404 compares the count to a threshold and invokes the counter circuit 402 to reset the count when the count satisfies and/or otherwise meets a threshold. For example, the comparator circuit 404 can assert a reset signal from an output (A_eq_B) of the comparator circuit 404 to a clear input (CLR) of the counter circuit 402 when the count is equal to a value associated with a corresponding one of the phase selection inputs 312a-d of FIG. 3.

In the illustrated example of FIG. 4, CLKIN is coupled to the clock generator circuit 314 of FIG. 3, a first example logic gate 406, a first input of a second example logic gate 408, and a second input of a third example logic gate 410. In FIG. 4, the first logic gate 406 is an inverter, the second logic gate 408 is a first AND gate, and the third logic gate 410 is a second AND gate.

In the illustrated example of FIG. 4, an output of the first inverter 406 is coupled to a clock input (CLOCK) of the counter circuit 402. In FIG. 4, outputs Q<0:3> of the counter circuit 402 are coupled to first inputs A<0:3> of the comparator circuit 404. In FIG. 4, a respective one of the phase selection inputs 312a-d is coupled to second inputs B<0:3> of the comparator circuit 404. An output of a fourth example logic gate 412 is coupled to a second input of the first AND gate 408 and to an input of a fifth example logic gate 414.

In the illustrated example of FIG. 4, the fourth logic gate 412 is a NOR gate. The inputs of the NOR gate 412 are coupled to the outputs Q<0:3> of the counter circuit 402. For example, the outputs Q<0:3> can include four electrical connections, such as a first electrical connection corresponding to Q<0>, a second electrical connection corresponding to Q<1>, a third electrical connection corresponding to Q<2>, and a fourth electrical connection corresponding to Q<3>. In FIG. 4, the fifth logic gate 414 is a second inverter. An output of the second inverter 414 is coupled to a first input of the second AND gate 410. An output of the first AND gate 408 is coupled to CLKREC of the first clock recovery circuit 302a. An output of the second AND gate 410 is coupled to CLKOUT of the first clock recovery circuit 302a. For example, CLKIN, A<0:3>, CLKREC, and CLKOUT may be implemented using electrical pins, integrated circuit pins, integrated device pins, etc. Alternatively, the first clock recovery circuit 302a may be implemented using any other type of logic gate for one or more of the first through fifth logic gates 406, 408, 410, 412, 414.

In operation, the first clock recovery circuit 302a obtains a first one of the clock pulses 212, 214, 216, 218 of FIG. 2 at CLKIN. The first clock recovery circuit 302a passes a first received one of the clock pulses 212, 214, 216, 218 at CLKIN to the first power converter 304a via CLKREC when a count determined by the counter circuit 402 corresponds to '0000'. For example, in response to the first clock recovery circuit 302a receiving the first clock pulse 212, the input of the first inverter 406 is a logic High (e.g., a logic High signal, a logic High voltage, etc.) and outputs a logic Low (e.g., a logic Low signal, a logic Low voltage, etc.) to CLOCK of the counter circuit 402. Accordingly, the counter circuit 402 does not increment the count in response to the first clock pulse 212 and, thus, the NOR gate 412 outputs a logic High because each input of the NOR gate 412 is a logic Low. The first clock pulse 212 is transmitted to the first input of the first AND gate 408 and the second input of the second AND gate 410. The first clock recovery circuit 302a transmits the first clock pulse 212 to the first power converter 304a in response to the first AND gate 408 outputting a logic High based on the first clock pulse 212 and the logic High from the NOR gate 412. The first clock recovery circuit 302a does not transmit the first clock pulse 212 to the second clock recovery circuit 302b because the second AND gate 410 outputs a logic Low in response to the first clock pulse 212 and a logic Low from the second inverter 414. The second inverter 414 outputs a logic Low in response to the NOR gate 412 outputting a logic High.

In other examples, the first clock recovery circuit 302a can re-transmit one or more received ones of the clock pulses 212, 214, 216, 218 at CLKIN to a different one of the clock recovery circuits 302b-d via CLKOUT. For example, in response to the falling edge of the first clock pulse 212, the input of the first inverter 406 is a logic Low and outputs a logic High to CLOCK. The counter circuit 402 increments the count from 0 to 1 (e.g., from '0000' to '0001'). In response to the first inverter 406 outputting a logic High, the counter circuit 402 outputs a logic High (e.g., Q<3> is 1) to the comparator circuit 404. The comparator circuit 404 compares the first input, which in this example is '0001' because Q<0> is 0, Q<1> is 0, Q<2> is 0, and Q<3> is 1, to the second input of '0011'. The comparator 404 circuit outputs a logic Low for A_eq_B because the first input is not equal to the second input.

When the counter circuit 402 outputs a logic High for one of the electrical connections of Q<0:3>, the NOR gate 412 outputs a logic Low, which causes the first AND gate 408 to output a logic Low and block the transmission of the second clock pulse 214 to the first power converter 304a. When the NOR gate 412 outputs a logic Low, the second inverter 414 outputs a logic High, which enables the second AND gate 410 to pass the second clock pulse 214 to the second clock recovery circuit 302b. In such examples, the first clock recovery circuit 302a can transmit the third and fourth clock pulses 216, 218 to the second clock recovery circuit 302b. In response to the falling edge of the fourth clock pulse 218, the counter circuit 402 increments the count from '0001' to '0010', which causes the comparator circuit 404 to output a logic High and reset the counter circuit 402 for the next switching cycle of the switched mode power conversion system 300 of FIG. 3.

Figure 5:
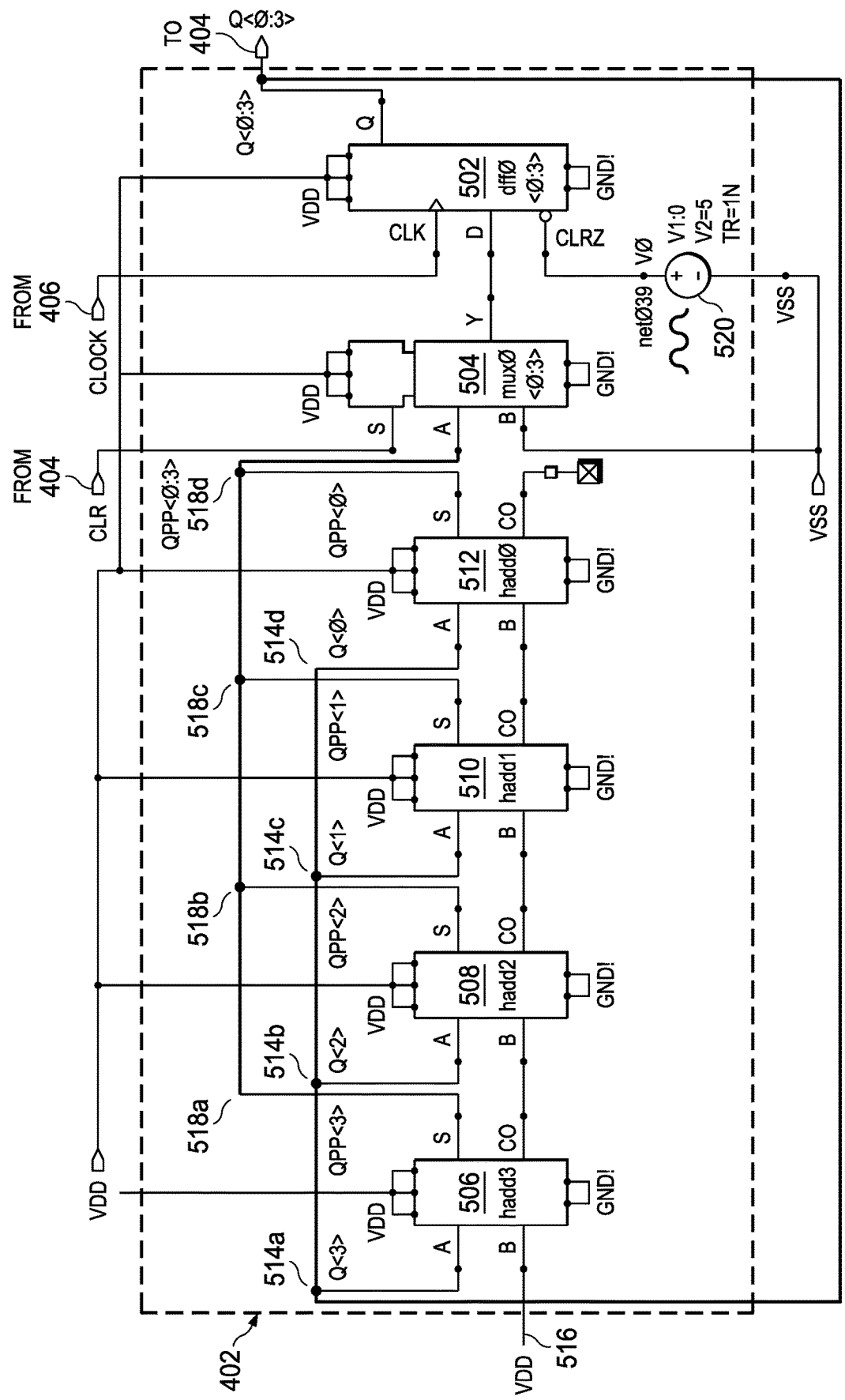
FIG. 5 is a schematic illustration of an example implementation of the counter circuit of FIG. 4.

FIG. 5 is a schematic illustration of an example implementation of the counter circuit 402 of FIG. 4. In FIG. 5, the counter circuit 402 includes an example flip-flop circuit 502, an example multiplexer circuit 504, and example half-adder (HA) circuits 506, 508, 510, 512. In FIG. 5, the flip-flop circuit 502 includes four D-type flip-flops DFF0<0:3> including a first flip-flop DFF0<3>, a second flip-flop DFF0<2>, a third flip-flop DFF0<1>, and a fourth flip-flop DFF0<0>. For example, each of the flip-flops DFF0<0:3> may have a clock input (CLK), a data input (D), a clear input (CLRZ), and an output (Q). Alternatively, the flip-flop circuit 502 may be any other type of flip-flop and/or include a different number of flip-flops.

In the illustrated example of FIG. 5, the multiplexer circuit 504 includes four multiplexers MUX0<0:3> including a first multiplexer MUX0<3>, a second multiplexer MUX0<2>, a third multiplexer MUX0<1>, and a fourth multiplexer MUX0<0>. For example, each of the multiplexers MUX0<0:3> may have a first input (A), a second input (B), a clear input (CLR), and an output (Y). Alternatively, the multiplexer circuit 504 may include a different number of multiplexers. In FIG. 5, the HA circuits 506, 508, 510, 512 include a first HA circuit 506, a second HA circuit 508, a third HA circuit 510, and a fourth HA circuit 512. Each of the HA circuits 506, 508, 510, 512 include a first input (A), a second input (B), a sum output (S Q), and a carry-over output (CO).

In the illustrated example of FIG. 5, CLOCK of FIG. 4 is coupled to a clock input (CLK) of the flip-flop circuit 502. Outputs Q<0:3> of the flip-flop circuit 502 are coupled to respective first inputs (A) of the HA circuits 506, 508, 510, 512. For example, a first output Q<3> 514a of the first flip-flop DFF0<3> is coupled to a first input A of the first HA circuit 506. A second output Q<2> 514b of the second flip-flop DFF0<2> is coupled to a first input A of the second HA circuit 508. A third output Q<1> 514c of the third flip-flop DFF0<1> is coupled to a first input (A) of the third HA circuit 510. A fourth output Q<0> 514d of the fourth flip-flop DFF0<0> is coupled to a first input (A) of the fourth HA circuit 512.

In the illustrated example of FIG. 5, a second input (B) of the first HA circuit 506 has an example voltage (VDD) 516. In FIG. 5, the HA circuits 506, 508, 510, 512 are arranged in a daisy-chain configuration. For example, a first carry-over output (CO) of the first HA circuit 506 is coupled to a second input B of the second HA circuit 508. A second CO output of the second HA circuit 508 is coupled to a second input B of the third HA circuit 510. A third CO output of the third HA circuit 510 is coupled to a second input B of the fourth HA circuit 512. A fourth CO output of the fourth HA circuit 512 is coupled to a ground rail, a reference rail, etc.

In the illustrated example of FIG. 5, respective sum outputs 518a-d of the HA circuits 506, 508, 510, 512 are coupled to respective first inputs (A) of the multiplexers MUX0<0:3>. For example, a first sum output QPP<3> 518a of the first HA circuit 506 is coupled to a first input (A) of the first multiplexer MUX0<3>. A second sum output QPP<2> 518b of the second HA circuit 508 is coupled to a first input (A) of the second multiplexer MUX0<2>. A third sum output QPP<1> 518c of the third HA circuit 510 is coupled to a first input (A) of the third multiplexer MUX0<1>. A fourth sum output QPP<0> 518d of the fourth HA circuit 512 is coupled to first input (A) of the fourth multiplexer MUX0<0>.

In operation, the HA circuits 506, 508, 510, 512 form a digital adder to add 1 to a value corresponding to the outputs of the flip-flop circuit 502. At a rising edge of CLOCK, the flip-flop circuit 502 can be updated to output either (1) a non-zero value corresponding to a previous value plus 1 (e.g., the plus 1 provided by the digital adder) or (2) a zero value when a clear input (CLRZ) of the flip-flop circuit 502 is enabled.

For example, at the beginning of the switching cycle 210 of FIG. 2, the first HA circuit 506 can assert a logic High as the first sum output 518a based on Q<3> being 0 (e.g., a logic Low) and VDD 516 corresponding to 1 (e.g., a logic High). The first CO output is a logic Low because the sum of 0 and 1 does not generate a carry-over value. The first sum output 518a is transmitted to the first input (A) of the first multiplexer MUX0<3>. At the beginning of the switching cycle 210, the first inputs (A) of the multiplexers MUX0<0:3> are selected to be connected to the outputs (Y) of the multiplexers MUX0<0:3>. The outputs (Y) of the multiplexers MUX0<0:3> are connected to respective data inputs (D) of the flip-flops DFF0<0:3>.

In operation, when the flip-flop circuit 502 obtains a rising-edge of CLOCK, which corresponds to the output of the first inverter 406 of FIG. 4, the flip-flop circuit 502 asserts a logic High on the output Q<3> of the first flip-flop DFF0<3>. Accordingly, electrical signals corresponding to the logic values of '0001' are transmitted from the flip-flop circuit 502 to the comparator circuit 404 based on the respective values of Q<0:2> being 0 and Q<3> being 1. After the flip-flop circuit 502 asserts a logic High on the output Q<3>, an example clock generator 520 generates and transmits a signal (e.g., a square wave signal) to CLRZ of the flip-flop circuit 502 to reset the outputs Q<0:3> of the flip-flop circuit 502.

In operation, the first HA circuit 506 asserts a logic High as the first sum output 518a based on Q<3> being 1 and VDD corresponding to 1. The first CO output is a logic High because the sum of 1 and 1 generates a carry-over value of 1. The second HA circuit 508 asserts a logic High as the second sum output 518b based on Q<2> being 0 and the first CO output from the first HA circuit 506 being 1. The second HA circuit 508 generates a logic Low for the second CO output because the sum of 1 and 0 does not generate a carry-over value. The second HA circuit 508 transmits a logic High as the second sum output 518b to the second multiplexer MUX0<2>.

In operation, the counter circuit 402 counts (e.g., iteratively counts) a quantity of the clock pulses 212, 214, 216, 218 re-transmitted from CLKIN of the first clock recovery circuit 302a to a different one of the clock recovery circuits 302b-d in the manner described above. When the comparator circuit 404 determines that the count is equal to a phase selection value corresponding to one of the phase selection inputs 312a-d of FIG. 3, the comparator circuit 404 asserts a logic High on CLR to direct the multiplexer circuit 504 to select the second inputs (B) to connect to the outputs (Y) at the beginning of a different switching cycle.

Figure 6:
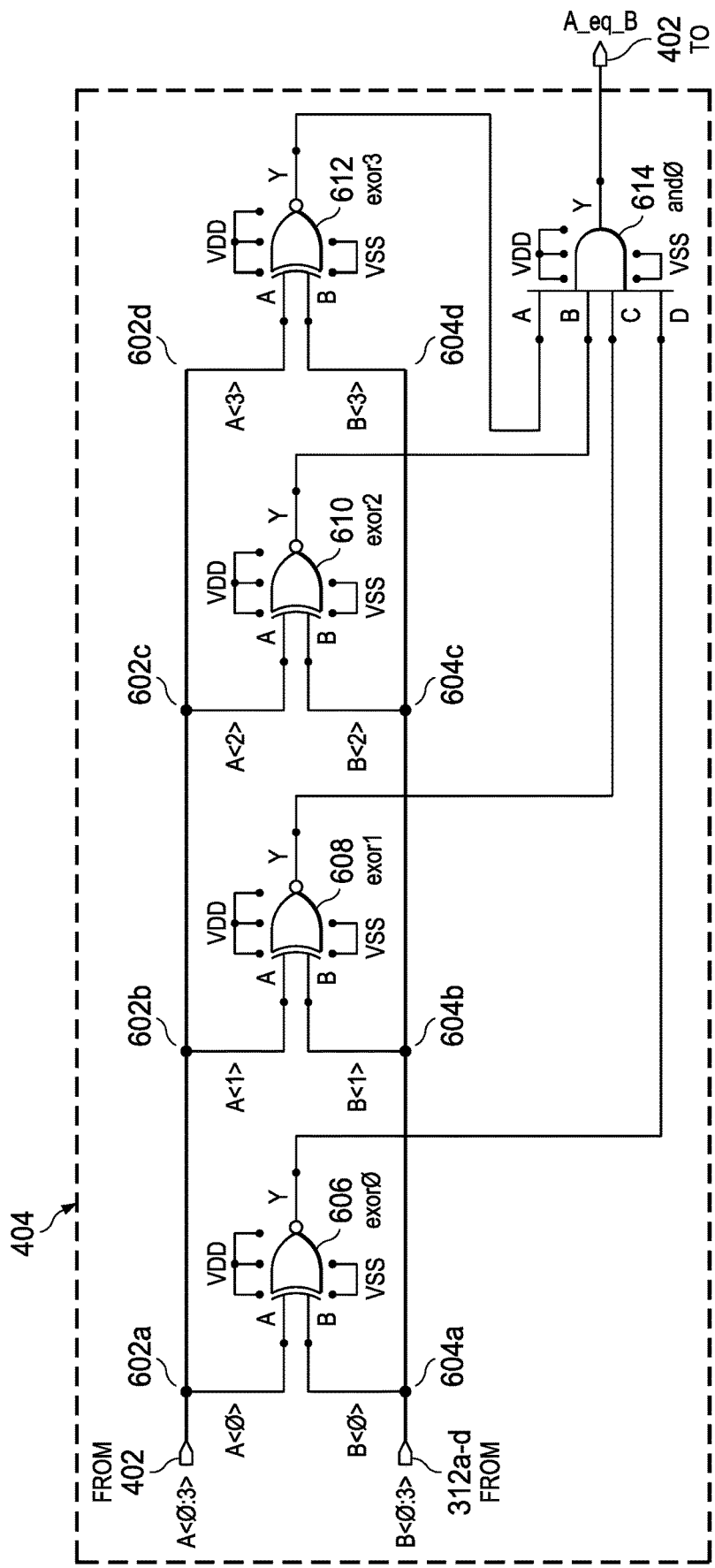
FIG. 6 is a schematic illustration of an example implementation of the comparator circuit of FIG. 4.

FIG. 6 is a schematic illustration of an example implementation of the comparator circuit 404 of FIG. 4. The comparator circuit 404 has first inputs A<0:3> 602a-d corresponding to the outputs Q<0:3> from the counter circuit 402 of FIGS. 4-5. The comparator circuit 404 has second inputs B<0:3> 604a-d corresponding to the phase selection inputs 312a-d of FIG. 3. The first inputs 602a-d include a first input 602a, a second input 602b, a third input 602c, and a fourth input 602d. The second inputs 604a-d include a fifth input 604a, a sixth input 604b, a seventh input 604c, and an eighth input 604d.

In the illustrated example of FIG. 6, the comparator circuit 404 includes five example logic gates 606, 608, 610, 612, 614 including a first example logic gate 606, a second example logic gate 608, a third example logic gate 610, a fourth example logic gate 612, and a fifth example logic gate 614. In FIG. 6, the first through fourth logic gates 606, 608, 610, 612 are XOR gates.

In the illustrated example of FIG. 6, the first XOR gate 606 has a first input A coupled to the first input 602a and a second input B coupled to the fifth input 604a. In FIG. 6, the second XOR gate 608 has a first input A coupled to the second input 602b and a second input B coupled to the sixth input 604b. In FIG. 6, the third XOR gate 610 has a first input A coupled to the third input 602c and a second input B coupled to the seventh input 604c. In FIG. 6, the fourth XOR gate 612 has a first input A coupled to the fourth input 602d and a second input B coupled to the eighth input 604d.

In the illustrated example of FIG. 6, respective outputs (Y) of the XOR gates 606, 608, 610, 612 are coupled to respective inputs (A-D) of the fifth logic gate 614. In FIG. 6, the fifth logic gate 614 is an AND gate. The XOR gates 606, 608, 610, 612 assert respective logic Highs (e.g., logic High signals) as an output when a corresponding first input and second input of the XOR gates 606, 608, 610, 612 are both logic Highs. For example, when A<0> and B<0> are both logic Highs, the first XOR gate 606 asserts a logic High to input D of the AND gate 614. The AND gate 614 asserts a logic High when each of the XOR gates 606, 608, 610, 612 assert logic Highs. For example, the AND gate 614 can assert a logic High when the count (e.g., the count represented by the first inputs A<0:3>) from the counter circuit 402 equals a corresponding one of the phase selection inputs 312a-d (e.g., the phase selection input represented by the second inputs B<0:3>). The AND gate 614 asserts a logic High as the A_eq_B signal, which is transmitted to CLR of the counter circuit 402 to reset the count.

Figure 7:
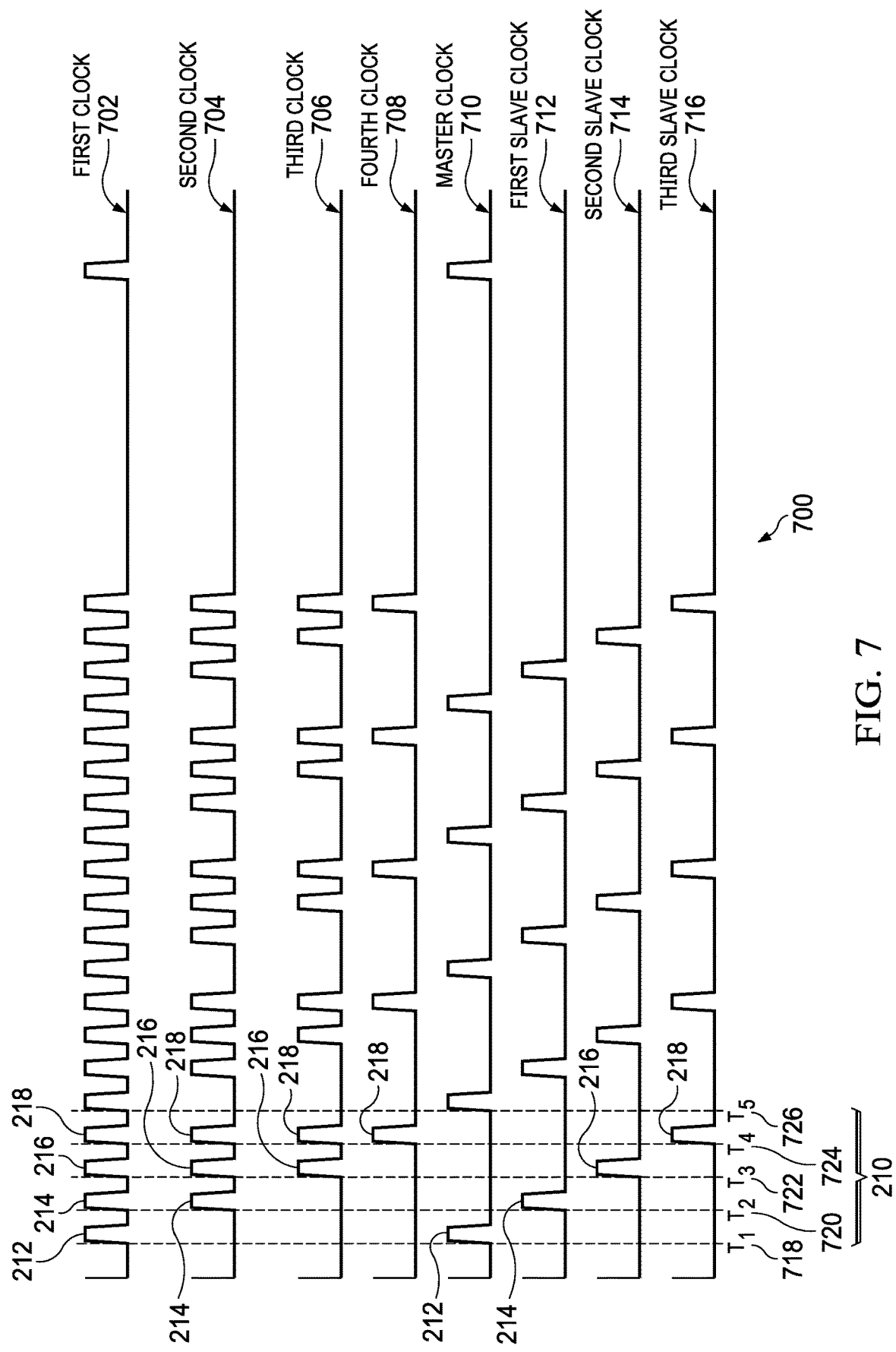
FIG. 7 is a first example timing diagram corresponding to the example clock pulse propagation sequence of FIG. 2 implemented by the example switched mode power conversion system of FIG. 3 using a first example clock frequency.

FIG. 7 is a first example timing diagram 700 corresponding to the clock pulse propagation sequence 200 of FIG. 2 implemented by the switched mode power conversion system 300 of FIG. 3 using a first example clock frequency. Depicted in FIG. 7 are example waveforms for first through fourth example clock signals 702, 704, 706, 708. In FIG. 7, the first clock signals 702 are generated by the master integrated device 202 of FIG. 2 based on the first clock frequency. In FIG. 7, the second clock signals 704 are transmitted from the master integrated device 202 to the first slave integrated device 204 of FIG. 2. In FIG. 7, the third clock signals 706 are transmitted from the first slave integrated device 204 to the second slave integrated device 206 of FIG. 2. In FIG. 7, the fourth clock signals 708 are transmitted from the second slave integrated device 206 to the third slave integrated device 208 of FIG. 2. Further depicted in FIG. 7 are example waveforms for a master clock signal 710, a first example slave clock signal 712, a second example slave clock signal 714, and a third example slave clock signal 716. For example, the master clock signal 710 can correspond to CLK_3 of FIG. 3, the first slave clock signal 712 can correspond to CLK_2 of FIG. 3, the second slave clock signal 714 can correspond to CLK_1 of FIG. 3, and the third slave clock signal 716 can correspond to CLK_0 of FIG. 3.

In operation, the clock generator circuit 314 of FIG. 3 generates the first clock signals 702 including the clock pulses 212, 214, 216, 218 of FIG. 2. The master integrated device 202 switches to the first clock pulse 212 at a first example time (T1) 718 and transmits the second through fourth clock pulses 214, 216, 218 to the first slave integrated device 204. In FIG. 7, the master integrated device 202 transmits the second through fourth clock pulses 214, 216, 218 to the first slave integrated device 204 at a second example time (T2) 720, a third example time (T3) 722, and a fourth example time (T4) 724, respectively. In FIG. 7, the time period from the first time 718 until a fifth example time (T5) 726 can correspond to the switching cycle 210 of FIG. 2.

In the illustrated example of FIG. 7, the first slave integrated device 204 switches to the second clock pulse 214 at the second time 720. In FIG. 7, the first slave integrated device 204 re-transmits the third clock pulse 216 and the fourth clock pulse 218 to the second slave integrated device 206 at the third time 722 and the fourth time 724, respectively. In FIG. 7, the second slave integrated device 206 switches to the third clock pulse 216 at the third time 722. In FIG. 7, the second slave integrated device 206 re-transmits the fourth clock pulse 218 to the third slave integrated device 208 at the fourth time 724. At the fifth time 726, the clock generator circuit 314 generates a first one of a different set of clock signals during a different switching cycle from the switching cycle 210 of FIG. 2.

Figure 8:
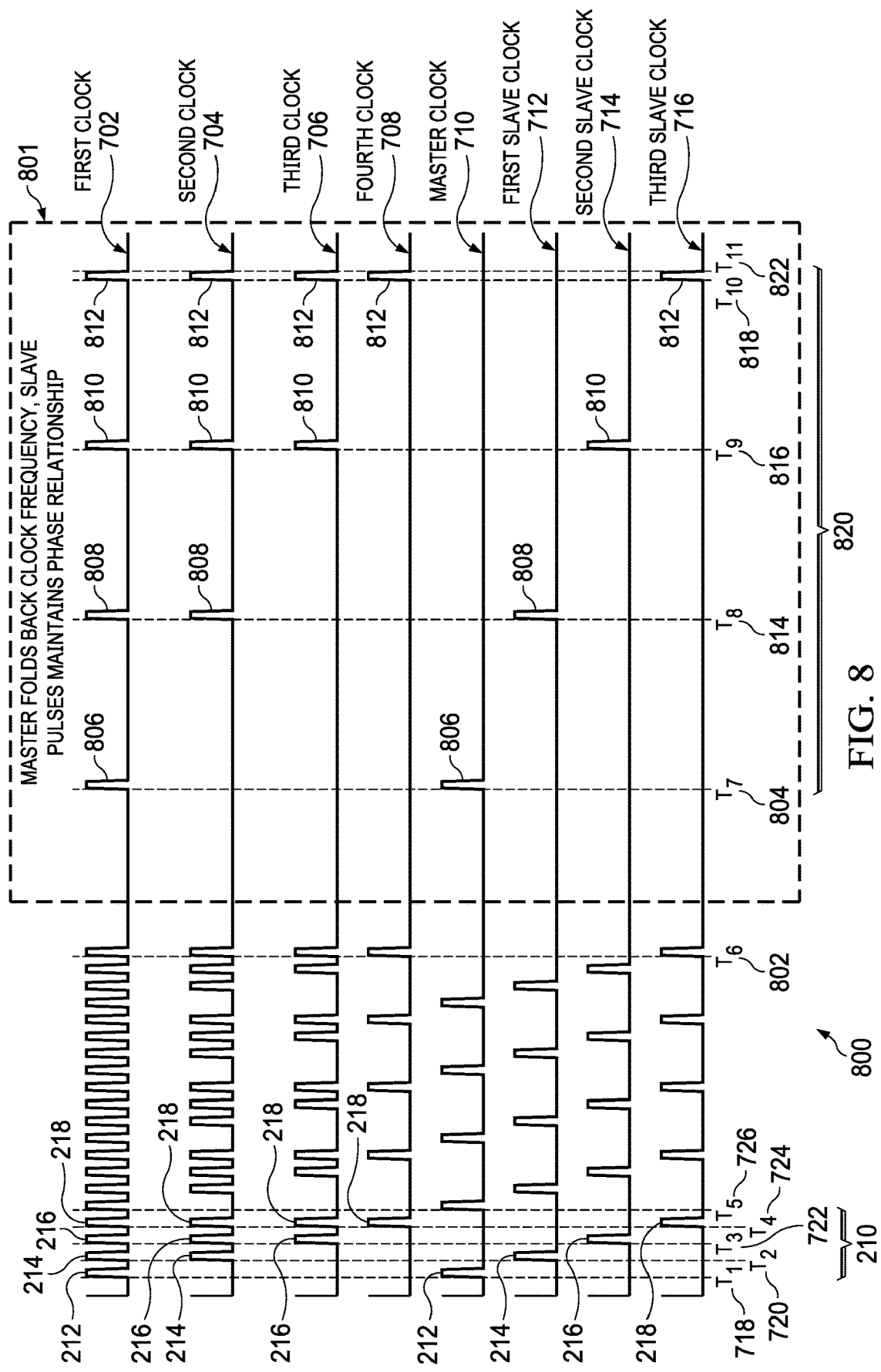
FIG. 8 is a second example timing diagram corresponding to the example clock pulse propagation sequence of FIG. 2 implemented by the example switched mode power conversion system of FIG. 3 using a second example clock frequency.

FIG. 8 is a second example timing diagram 800 depicting the clock pulse propagation sequence 200 of FIG. 2 implemented by the switched mode power conversion system 300 of FIG. 3 using a second example clock frequency. Depicted in FIG. 8 are example waveforms for the first through fourth clock signals 702, 704, 706, 708 of FIG. 7. Further depicted in FIG. 8 are example waveforms for the master clock signal 710, the first slave clock signal 712, the second slave clock signal 714, and the third slave clock signal 716 of FIG. 7.

In the illustrated example of FIG. 8, the master integrated device 202 of FIG. 2 generates the first clock signals 702 based on the first clock frequency from the first time 718 until a sixth example time (T6) 802. In FIG. 8, the master integrated device 202 generates the first clock signals 702 based on the second clock frequency during an example time period 801 starting at a seventh example time (T7) 804. The second clock frequency in the second timing diagram 800 is different from the first clock frequency. For example, the second clock frequency in FIG. 8 is less (e.g., slower) than the first clock frequency. The second timing diagram 800 can correspond to an example where the master integrated device 202 folds back the first clock frequency to the second clock frequency during PFM operation.

In the illustrated example of FIG. 8, the master integrated device 202 generates fifth through eighth example clock pulses 806, 808, 810, 812 using the second clock frequency. In FIG. 8, the master integrated device 202 generates the fifth clock pulse 806 and switches to the fifth clock pulse 806 at the seventh time 804. The master integrated device 202 generates and transmits the sixth clock pulse 808 to the first slave integrated device 204 of FIG. 2 at the eighth time 814. In response to obtaining the sixth clock pulse 808, the first slave integrated device 204 switches to the sixth clock pulse 808.

In the illustrated example of FIG. 8, the master integrated device 202 generates and transmits the seventh clock pulse 810 to the first slave integrated device 204 of FIG. 2 at the ninth time 816. In response to obtaining the seventh clock pulse 810, the first slave integrated device 204 re-transmits the seventh clock pulse 810 to the second slave integrated device 206. In response to obtaining the seventh clock pulse 810, the second slave integrated device 206 switches to the seventh clock pulse 810.

In the illustrated example of FIG. 8, the master integrated device 202 generates and transmits the eighth clock pulse 812 to the first slave integrated device 204 of FIG. 2 at the tenth time 818. In response to obtaining the eighth clock pulse 812, the first slave integrated device 204 re-transmits the eighth clock pulse 812 to the second slave integrated device 206. In response to obtaining the eighth clock pulse 812, the second slave integrated device 206 re-transmits the eighth clock pulse 812 to the third slave integrated device 208. In response to obtaining the eighth clock pulse 812, the third slave integrated device 208 switches to the eighth clock pulse 812. In FIG. 8, the switching cycle 210 of FIG. 2 is a first switching cycle and a second example switching cycle 820 spans the seventh time 804 until an eleventh example time (T11) 822.

Advantageously, the switched mode power conversion system 300 of FIG. 3 during the second switching cycle 820 of FIG. 8 generates the fifth through eighth clock pulses 806, 808, 810, 812 at the second clock frequency to cause the switching behavior of the integrated devices 202, 204, 206, 208 of FIG. 2 to remain interleaved when the first clock frequency drops to the second clock frequency. For example, if the first clock frequency reduces to the second clock frequency during PFM operation, the switched mode power conversion system 300 can maintain the interleaving of the integrated devices 202, 204, 206, 208 because the master integrated device 202 determines the timing, phase angles, etc., for all of the clock pulses 212, 214, 216, 218, 806, 808, 810, 812 depicted in FIG. 8. Advantageously, when the master integrated device 202 determines the timing, phase angles, etc., for all of the clock pulses 212, 214, 216, 218, 806, 808, 810, 812, the integrated devices 202, 204, 206, 208 do not miss switching events and, thus, improve an efficiency of the power converters 304a-d of FIG. 3 compared to conventional power converters.

Figure 9:
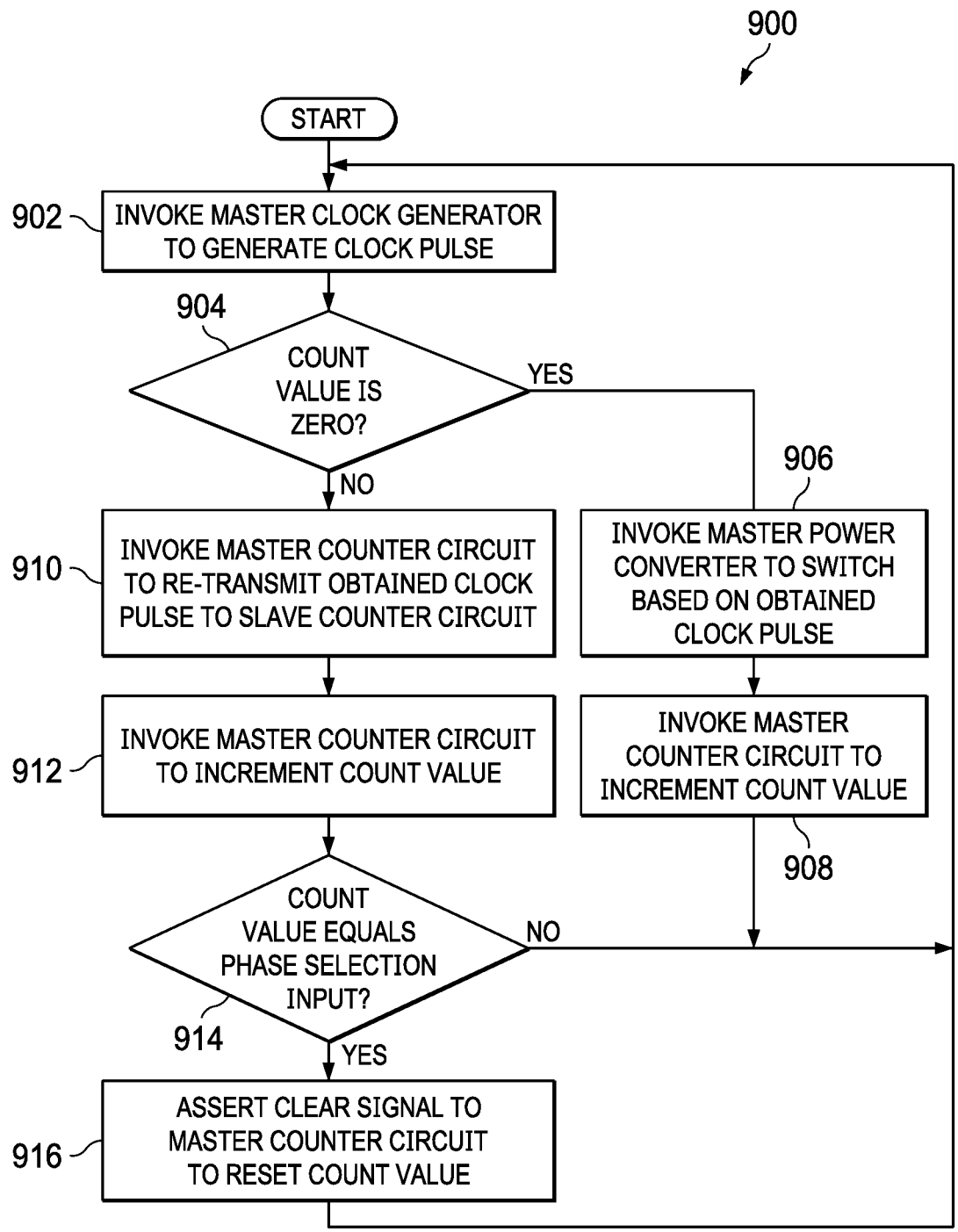
FIGS. 9-10 are flowcharts representative of processes that may be carried out while utilizing example machine readable instructions that may be executed and/or hardware configured to implement the example switched mode power conversion system of FIG. 3
Figure 10:
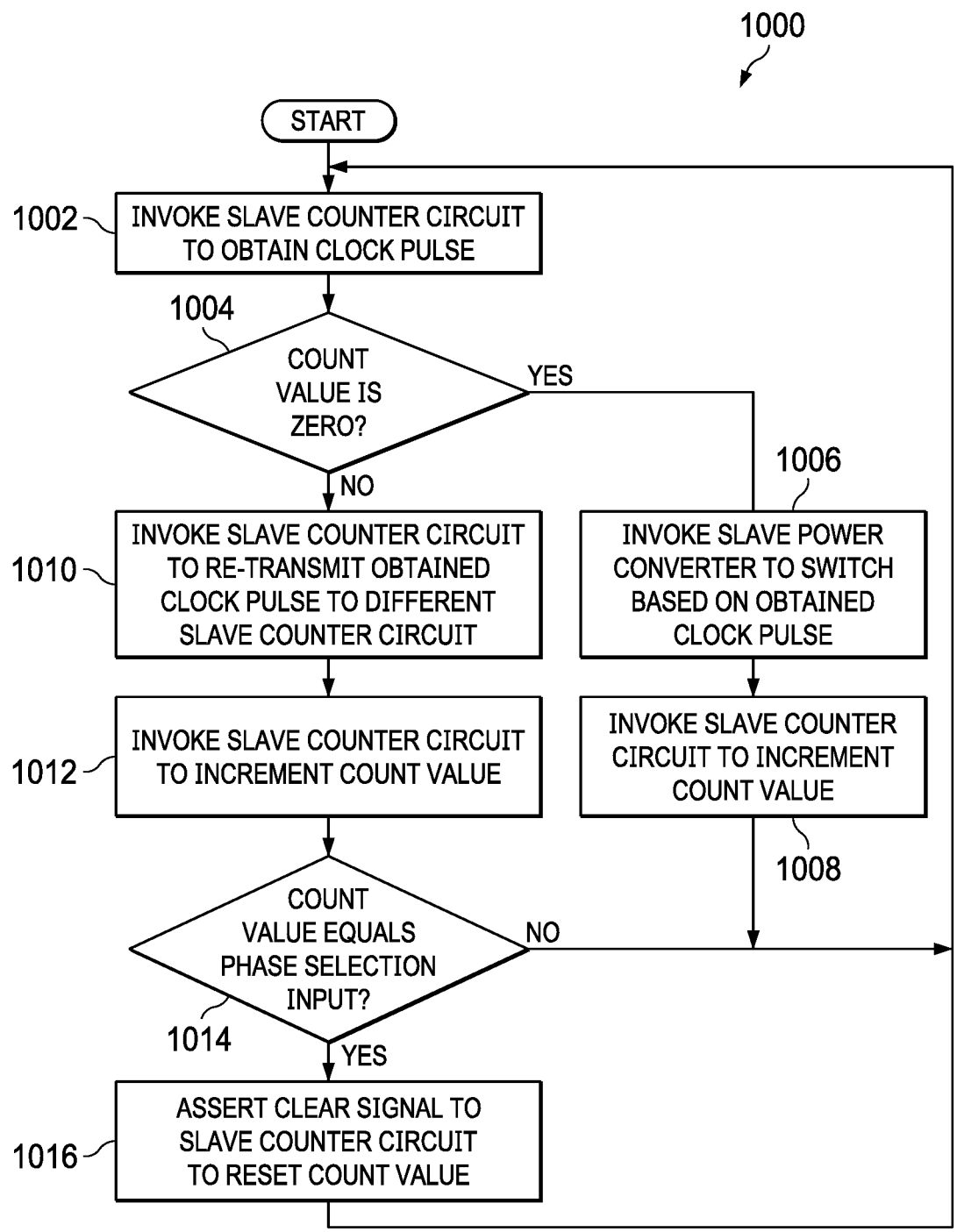

Flowcharts representative of example hardware logic, machine readable instructions, hardware implemented state machines, and/or any combination thereof for implementing the switched mode power conversion system 300 of FIG. 3 is shown in FIGS. 9-10. The machine readable instructions may be an executable program or portion of an executable program for execution by one or more computer processors, one or more microcontrollers, etc. For example, the machine readable instructions may be executed by one or more integrated circuits, logic circuits, microprocessors, GPUs, DSPs, or controllers from any desired family or manufacturer. For example, the one or more integrated circuits, logic circuits, microprocessors, GPUs, DSPs, or controllers may be semiconductor based (e.g., silicon based) device(s). The program may be embodied in software stored on a non-transitory computer readable storage medium such as non-volatile memory, volatile memory, etc., associated with the one or more computer processors, the one or more microcontrollers, etc., but the entire program and/or parts thereof could alternatively be executed by a device other than the one or more computer processors, the one or more microcontrollers, etc., and/or embodied in firmware or dedicated hardware. Further, although the example program is described with reference to the flowcharts illustrated in FIGS. 9-10, many other methods of implementing the example switched mode power conversion system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 9-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 9 is a flowchart representative of a first example process 900 that may be carried out while utilizing machine readable instructions that may be executed and/or hardware configured to implement the switched mode power conversion system 300 of FIG. 3. For example, the first process 900 may be implemented using hardware logic, one or more hardware implemented state machines, one or more controllers executing machine readable instructions, one or more processors executing machine readable instructions, etc., and/or a combination thereof. For example, the first process 900 of FIG. 9 can be executed to implement the master integrated device 202 and the first slave integrated device 204 of FIG. 2 to facilitate switching operations of the first power converter 304a and the second power converter 304b of FIG. 3. The first process 900 of FIG. 9 begins at block 902, at which the switched mode power conversion system 300 invokes the clock generator circuit 314 of FIG. 3 to generate a clock pulse. For example, the clock generator circuit 314 may generate the first clock pulse 212 of FIG. 2.

At block 904, the switched mode power conversion system 300 determines whether a count value is zero. For example, the counter circuit 402 of the first clock recovery circuit 302a may determine that a count value is 0 corresponding to a bit value of '0000'. If, at block 904, the switched mode power conversion system 300 determines that the count is zero, then, at block 906, the switched mode power conversion system 300 invokes a master power converter to switch based on the obtained clock pulse. For example, the first clock recovery circuit 302a may transmit the first clock pulse 212 to the first power converter 304a of FIG. 3 to cause the first power converter 304a to switch based on the first clock pulse 212.

At block 908, the switched mode power conversion system 300 invokes a master counter circuit to increment the count value. For example, the counter circuit 402 of the first clock recovery circuit 302a may increment the count value from 0 to 1, or from '0000' to '0001'. In response to invoking the master counter circuit to increment the count value at block 908, control returns to block 902 to invoke the master clock generator to generate another clock pulse.

If, at block 904, the switched mode power conversion system 300 determines that the count is not zero, control proceeds to block 910 to invoke the master counter circuit to transmit the obtained clock pulse to a slave counter circuit. For example, the clock generator circuit 314 may generate the second clock pulse 214 of FIG. 2. In such examples, the counter circuit 402 of the first clock recovery circuit 302a can re-transmit the second clock pulse 214 to the counter circuit 402 of the second clock recovery circuit 302b of FIG. 3.

At block 912, the switched mode power conversion system 300 invokes the master counter circuit to increment the count value. For example, the counter circuit 402 of the first clock recovery circuit 302a may increment the count value from 1 to 2, or from '0001' to '0010'. In response to invoking the master counter circuit to increment the count value at block 912, then, at block 914, the switched mode power conversion system 300 determines whether the count value equals the phase selection input. For example, the comparator circuit 404 of FIG. 4 of the first clock recovery circuit 302a may compare the count value of '0010' to the first phase selection input 312a of '0011'. In such examples, the comparator circuit 404 can determine that the count value is different from the first phase selection input 312a.

If, at block 914, the switched mode power conversion system 300 determines that the count value does not equal the phase selection input, control returns to block 902 to invoke the master clock generator to generate another clock pulse. If, at block 914, the switched mode power conversion system 300 determines that the count value equals the phase selection input, then, at block 916, the switched mode power conversion system 300 asserts a clear signal to the master counter circuit to reset the count value. For example, the comparator circuit 404 of the first clock recovery circuit 302a may assert the A_eq_B signal of FIG. 4 to CLR of the counter circuit 402 of the first clock recovery circuit 302a to reset the count value corresponding to Q<0:3>. In such examples, resetting the count value can correspond to assigning a zero to the count value corresponding to Q<0:3>. In response to asserting the clear signal to the master counter circuit to reset the count value at block 916, the first process 900 of FIG. 9 returns to block 902 to invoke the master clock generator to generate another clock pulse.

FIG. 10 is a flowchart representative of a second example process 1000 that may be carried out utilizing machine readable instructions that may be executed and/or hardware configured to implement the switched mode power conversion system 300 of FIG. 3. For example, the second process 1000 may be implemented using hardware logic, one or more hardware implemented state machines, one or more controllers executing machine readable instructions, one or more processors executing machine readable instructions, etc., and/or a combination thereof. For example, the second process 1000 of FIG. 10 can be executed to implement the first slave integrated device 204 and the second slave integrated device 206 of FIG. 2 to facilitate switching operations of the second power converter 304b and the third power converter 304c of FIG. 3. The second process 1000 of FIG. 10 begins at block 1002, at which the switched mode power conversion system 300 invokes a slave counter circuit to obtain a clock pulse. For example, the counter circuit 402 of FIG. 4 of the second clock recovery circuit 302b of FIG. 3 may obtain the second clock pulse 214 of FIG. 2 from the first clock recovery circuit 302a of FIG. 3.

At block 1004, the switched mode power conversion system 300 determines whether a count value is zero. For example, the counter circuit 402 of the second clock recovery circuit 302b may determine that a count value is 0 corresponding to a bit value of '0000'. If, at block 1004, the switched mode power conversion system 300 determines that the count is zero, then, at block 1006, the switched mode power conversion system 300 invokes a slave power converter to switch based on the obtained clock pulse. For example, the second clock recovery circuit 302b may transmit the second clock pulse 214 to the second power converter 304b of FIG. 3 to cause the second power converter 304b to switch based on the second clock pulse 214.

At block 1008, the switched mode power conversion system 300 invokes a slave counter circuit to increment the count value. For example, the counter circuit 402 of the second clock recovery circuit 302b may increment the count value from 0 to 1, or from '0000' to '0001'. In response to invoking the slave counter circuit to increment the count value at block 1008, control returns to block 1002 to invoke the slave counter circuit to obtain another clock pulse.

If, at block 1004, the switched mode power conversion system 300 determines that the count is not zero, control proceeds to block 1010 to invoke the slave counter circuit to re-transmit the obtained clock pulse to a different slave counter circuit. For example, after the second power converter 304b switches to the second clock pulse 214, the counter circuit 402 of the second clock recovery circuit 302b may obtain the third clock pulse 216 of FIG. 2 from the first clock recovery circuit 302a. In such examples, the counter circuit 402 of the first clock recovery circuit 302a can re-transmit the third clock pulse 216 to the counter circuit 402 of the third clock recovery circuit 302c of FIG. 3.

At block 1012, the switched mode power conversion system 300 invokes the slave counter circuit to increment the count value. For example, the counter circuit 402 of the second clock recovery circuit 302b may increment the count value from 1 to 2, or from '0001' to '0010'. In response to invoking the slave counter circuit to increment the count value at block 1012, then, at block 1014, the switched mode power conversion system 300 determines whether the count value equals the phase selection input. For example, the comparator circuit 404 of FIG. 4 of the second clock recovery circuit 302b may compare the count value of '0010' to the second phase selection value associated with the second phase selection input 312b of '0010'. In such examples, the comparator circuit 404 can determine that the count value is equal to the second phase selection value of '0010'.

If, at block 1014, the switched mode power conversion system 300 determines that the count value does not equal the phase selection input, control returns to block 1002 to invoke the slave counter circuit to obtain another clock pulse. If, at block 1014, the switched mode power conversion system 300 determines that the count value equals the phase selection input, then, at block 1016, the switched mode power conversion system 300 asserts a clear signal to the slave counter circuit to reset the count value. For example, the comparator circuit 404 of the second clock recovery circuit 302b may assert the A_eq_B signal of FIG. 4 to CLR of the counter circuit 402 of the second clock recovery circuit 302b to reset the count value corresponding to Q<0:3>. In such examples, resetting the count value can correspond to assigning a zero to the count value corresponding to Q<0:3>. In response to asserting the clear signal to the slave counter circuit to reset the count value at block 1016, the second process 1000 of FIG. 10 returns to block 1002 to invoke the slave counter circuit to obtain another clock pulse.

From the foregoing, it will be appreciated that example systems, methods, apparatus, and articles of manufacture have been disclosed that improve switching operations of multiphase switched mode power conversion systems. The disclosed systems, methods, apparatus, and articles of manufacture improve the efficiency of a power converter by reducing the likelihood of the power converter missing a switching event when supporting PFM operation. The disclosed systems, methods, apparatus, and articles reduce the likelihood by invoking an integrated device configured as a master to generate clock pulses for the master and for one or more integrated devices configured as slaves. Advantageously, by arranging the master and the one or more slaves in a daisy-chain configuration, the master can generate the clock pulses spaced at equal intervals of 360 degrees divided by the number of integrated devices including the master. By generating the clock pulses in this manner, the master can maintain the phases of the switched mode power conversion system at different clock frequencies, switching frequencies, etc. Advantageously, when the switched mode power conversion system supports PFM operation, even at substantially low switching frequencies, the master and the one or more slaves can switch based on a clock pulse generated by the master to cause the phases of the switched mode power conversion system to remain interleaved.

Example methods, apparatus, systems, and articles of manufacture for multiphase switched mode power supply clocking circuits are disclosed herein. Further examples and combinations thereof include the following:

Example 1 includes an apparatus comprising a first clock recovery circuit to in response to obtaining a first clock pulse, transmit the first clock pulse to a power converter to cause the power converter to switch based on the first clock pulse, in response to obtaining a second clock pulse after the first clock pulse re-transmit the second clock pulse to a second clock recovery circuit, and increment a count value, and in response to the count value meeting a phase selection value, reset the count value.

Example 2 includes the apparatus of example 1, wherein the first clock recovery circuit is to transmit the first clock pulse by buffering the first clock pulse and transmitting the buffered first clock pulse to the power converter, and is to re-transmit the second clock pulse by buffering the second clock pulse and transmitting the buffered second clock pulse to the second clock recovery circuit.

Example 3 includes the apparatus of example 1, further including a clock generator circuit to generate the first clock pulse and the second clock pulse.

Example 4 includes the apparatus of example 1, wherein the first clock recovery circuit is to obtain the first clock pulse and the second clock pulse from a third clock recovery circuit.

Example 5 includes the apparatus of example 1, wherein the first clock recovery circuit is to transmit the first clock pulse to the power converter when the count value is a first value, re-transmit the second clock pulse to the second clock recovery circuit when the count value is a second value, and reset the count value to the first value in response to the count value meeting the phase selection value.

Example 6 includes the apparatus of example 1, wherein the first clock recovery circuit includes a counter circuit to increment the count value, and a comparator circuit coupled to the counter circuit, the comparator circuit is to compare the count value to the phase selection value, determine whether the count value meets the phase selection value, and reset the count value when the count value meets the phase selection value.

Example 7 includes the apparatus of example 1, wherein the first clock recovery circuit includes a first inverter having a first input and a first output, a counter circuit having a third input, a fourth input, and a second output, the third input coupled to the first output, a comparator circuit having a fifth input, a sixth input, and a third output, the fifth input coupled to the second output, the third output coupled to the fourth input, a NOR gate having seventh through tenth inputs and a fourth output, the seventh through tenth inputs coupled to the second output, a second inverter having an eleventh input and a fifth output, the eleventh input coupled to the fourth output, a first AND gate having a twelfth input, a thirteenth input, and a sixth output, the twelfth input coupled to the first input, the thirteenth input coupled to the fourth output and the eleventh input, the sixth output coupled to the power converter, and a second AND gate having a fourteenth input, a fifteenth input, and a seventh output, the fourteenth input coupled to the fifth output, the fifteenth input coupled to the first input, the seventh output coupled to the second clock recovery circuit.

Example 8 includes the apparatus of example 1, wherein the first clock recovery circuit includes a counter circuit and a comparator circuit, the counter circuit including a flip-flop having a first input, a second input, and a first output, the first input coupled to an output of an inverter, the inverter coupled to a clock generator circuit, a multiplexer having a third input, a fourth input, and a second output, the second output coupled to the second input, the third input coupled to an output of the comparator circuit, a first half-adder circuit having a fifth input, a sixth input, a third output, and a fourth output, the fifth input coupled to the first output, the sixth input having a voltage, the third output coupled to the fourth input, a second half-adder circuit having a seventh input, an eighth input, a fifth output, and a sixth output, the seventh input coupled to the first output, the eighth input coupled to the fourth output, the fifth output coupled to the fourth input, a third half-adder circuit having a ninth input, a tenth input, a seventh output, and an eighth output, the ninth input coupled to the first output, the tenth input coupled to the sixth output, the seventh output coupled to the fourth input, and a fourth half-adder circuit having an eleventh input, a twelfth input, and a ninth output, the eleventh input coupled to the first output, the twelfth input coupled to the eighth output, the ninth output coupled to the fourth input.

Example 9 includes the apparatus of example 1, wherein the first clock recovery circuit includes a counter circuit and a comparator circuit, the comparator circuit including an AND gate having first through fourth inputs and a first output, the first output coupled to an input of the counter circuit, a first XOR gate having a fifth input, a sixth input, and a second output, the fifth input coupled to the counter circuit, the sixth input coupled to a phase selection input, the second output coupled to the first input, a second XOR gate having a seventh input, an eighth input, and a third output, the seventh input coupled to the counter circuit, the eighth input coupled to the phase selection input, the third output coupled to the second input, a first XOR gate having a ninth input, a tenth input, and a fourth output, the ninth input coupled to the counter circuit, the tenth input coupled to the phase selection input, the fourth output coupled to the third input, and a first XOR gate having an eleventh input, a twelfth input, and a fifth output, the eleventh input coupled to the counter circuit, the twelfth input coupled to the phase selection input, the fourth output coupled to the fourth input.

Example 10 includes a power conversion system comprising a first device configured as a slave, the first device including a first clock recovery circuit, and a second device coupled to the first device, the second device configured as a master, the second device including a clock generator circuit to generate a first clock pulse and a second clock pulse, the second clock pulse to be generated after the first clock pulse, and a second clock recovery circuit to in response to obtaining the first clock pulse, transmit the first clock pulse to a power converter to cause the power converter to switch based on the first clock pulse, in response to obtaining the second clock pulse re-transmit the second clock pulse to the first clock recovery circuit, and increment a count value, and in response to the count value meeting a phase selection value, reset the count value.

Example 11 includes the power conversion system of example 10, wherein the power converter is a second power converter, the slave is a first slave, the second device includes the second power converter, and the first device includes a first power converter, and further including a third device configured as a second slave, the third device coupled to the first device, the third device including a third power converter and a third clock recovery circuit, and a fourth device configured as a third slave, the fourth device coupled to the third device, the fourth device including a fourth power converter and a fourth clock recovery circuit.

Example 12 includes the power conversion system of example 11, wherein the count value is a first count value, the phase selection value is a first phase selection value, and the clock generator circuit is to generate a third clock pulse, and wherein the first clock recovery circuit is to in response to obtaining the second clock pulse, transmit the second clock pulse to the first power converter to cause the first power converter to switch based on the second clock pulse, in response to obtaining the third clock pulse re-transmit the third clock pulse to the third clock recovery circuit, and increment a second count value, and in response to the second count value meeting a second phase selection value, reset the second count value, and in response to obtaining the third clock pulse, the third clock recovery circuit is to transmit the third clock pulse to the third power converter to cause the third power converter to switch based on the third clock pulse.

Example 13 includes the power conversion system of example 10, wherein the second clock recovery circuit includes a counter circuit to increment the count value, and a comparator circuit coupled to the counter circuit, the comparator circuit is to compare the count value to the phase selection value, determine whether the count value meets the phase selection value, and reset the count value when the count value meets the phase selection value.

Example 14 includes the power conversion system of example 10, wherein the second clock recovery circuit includes a first inverter having a first input and a first output, a counter circuit having a third input, a fourth input, and a second output, the third input coupled to the first output, a comparator circuit having a fifth input, a sixth input, and a third output, the fifth input coupled to the second output, the third output coupled to the fourth input, a NOR gate having seventh through tenth inputs and a fourth output, the seventh through tenth inputs coupled to the second output, a second inverter having an eleventh input and a fifth output, the eleventh input coupled to the fourth output, a first AND gate having a twelfth input, a thirteenth input, and a sixth output, the twelfth input coupled to the first input, the thirteenth input coupled to the fourth output and the eleventh input, the sixth output coupled to the power converter, and a second AND gate having a fourteenth input, a fifteenth input, and a seventh output, the fourteenth input coupled to the fifth output, the fifteenth input coupled to the first input, the seventh output coupled to the first clock recovery circuit.

Example 15 includes the power conversion system of example 10, wherein the second clock recovery circuit includes a counter circuit and a comparator circuit, the counter circuit including a flip-flop having a first input, a second input, and a first output, the first input coupled to an output of an inverter, the inverter coupled to the clock generator circuit, a multiplexer having a third input, a fourth input, and a second output, the second output coupled to the second input, the third input coupled to an output of the comparator circuit, a first half-adder circuit having a fifth input, a sixth input, a third output, and a fourth output, the fifth input coupled to the first output, the sixth input having a voltage, the third output coupled to the fourth input, a second half-adder circuit having a seventh input, an eighth input, a fifth output, and a sixth output, the seventh input coupled to the first output, the eighth input coupled to the fourth output, the fifth output coupled to the fourth input, a third half-adder circuit having a ninth input, a tenth input, a seventh output, and an eighth output, the ninth input coupled to the first output, the tenth input coupled to the sixth output, the seventh output coupled to the fourth input, and a fourth half-adder circuit having an eleventh input, a twelfth input, and a ninth output, the eleventh input coupled to the first output, the twelfth input coupled to the eighth output, the ninth output coupled to the fourth input.

Example 16 includes the power conversion system of example 10, wherein the second clock recovery circuit includes a counter circuit and a comparator circuit, the comparator circuit including an AND gate having first through fourth inputs and a first output, the first output coupled to an input of the counter circuit, a first XOR gate having a fifth input, a sixth input, and a second output, the fifth input coupled to the counter circuit, the sixth input coupled to a phase selection input, the second output coupled to the first input, a second XOR gate having a seventh input, an eighth input, and a third output, the seventh input coupled to the counter circuit, the eighth input coupled to the phase selection input, the third output coupled to the second input, a first XOR gate having a ninth input, a tenth input, and a fourth output, the ninth input coupled to the counter circuit, the tenth input coupled to the phase selection input, the fourth output coupled to the third input, and a first XOR gate having an eleventh input, a twelfth input, and a fifth output, the eleventh input coupled to the counter circuit, the twelfth input coupled to the phase selection input, the fourth output coupled to the fourth input.

Example 17 includes a method comprising generating a first clock pulse and a second clock pulse, in response to a first logic circuit obtaining the first clock pulse, transmitting, using the first logic circuit, the first clock pulse to a power converter coupled to the first logic circuit to cause the power converter to switch based on the first clock pulse, and in response to the first logic circuit obtaining the second clock pulse re-transmitting, using the first logic circuit, the second clock pulse to a second logic circuit, incrementing, using the first logic circuit, a count value from a first value to a second value, and in response to the count value meeting a phase selection value, resetting, using the first logic circuit, the count value.

Example 18 includes the method of example 17, wherein the power converter is a first power converter, and further including generating a third clock pulse, transmitting, using the first logic circuit, the third clock pulse to the second logic circuit, the second logic circuit coupled to the first logic circuit, and re-transmitting, using the second logic circuit, the third clock pulse to a third logic circuit, the third logic circuit coupled to the second logic circuit.

Example 19 includes the method of example 18, further including incrementing, using the first logic circuit, the count value from the second value to a third value in response to re-transmitting the third clock pulse to the second logic circuit, in response to the third value meeting the phase selection value, resetting, using the first logic circuit, the count value from the third value to the first value, and in response to the first logic circuit obtaining a fourth clock pulse, transmitting, using the first logic circuit, the fourth clock pulse to the first power converter to cause the first power converter to switch based on the fourth clock pulse.

Example 20 includes the method of example 17, wherein the power converter is a first power converter, and further including in response to the second logic circuit obtaining the second clock pulse, transmitting, using the second logic circuit, the second clock pulse to a second power converter coupled to the second logic circuit to cause the second power converter to switch based on the second clock pulse, in response to the first logic circuit obtaining a third clock pulse, transmitting, using the first logic circuit, the third clock pulse to the second logic circuit, in response to the second logic circuit obtaining the third clock pulse, re-transmitting, using the second logic circuit, the third clock pulse to a third logic circuit coupled to the second logic circuit, and in response to the third logic circuit obtaining the third clock pulse, transmitting, using the third logic circuit, the third clock pulse to a third power converter coupled to the third logic circuit, the third power converter to switch based on the third clock pulse.

Example 21 includes the method of example 17, wherein the first clock pulse and the second clock pulse are generated using a first clock frequency, and further including generating a third clock pulse and a fourth clock pulse using a second clock frequency, the second clock frequency less than the first clock frequency, in response to the first logic circuit obtaining the third clock pulse, transmitting, using the first logic circuit, the third clock pulse to the second logic circuit when the count value does not meet the phase selection value, and incrementing, using the first logic circuit, the count value from the second value to a third value.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent. Although this patent discloses example systems, methods, apparatus, and articles of manufacture using examples of logic (e.g., hardware logic) implementations, it is within the scope of this patent that the systems, methods, apparatus, and articles of manufacture may likewise be implemented using examples of machine readable instructions being executed by one or more controllers, one or more processors, etc.

What is claimed is:

1. A circuit comprising:
    a counter circuit having a clock input, a clear input, and a counter output, wherein the counter circuit includes:
        a first half adder having a first half adder input, a second half adder input, a first half adder output, and a second half adder output;
        a second half adder having a third half adder input, a fourth half adder input, a third half adder output, and a fourth half adder output, the third half adder input coupled to the first half adder input, the fourth half adder input coupled to the second half adder output, and the third half adder output coupled to the first half adder output;
        a third half adder having a fifth half adder input, a sixth half adder input, a fifth half adder output, and a sixth half adder output, the fifth half adder input coupled to the first half adder input, the sixth half adder input coupled to the fourth half adder output, and the fifth half adder output coupled to the first half adder output;
        a fourth half adder having a seventh half adder input, an eighth half adder input, a seventh half adder output, and an eighth half adder output, the seventh half adder input coupled to the first half adder input, the eighth half adder input coupled to the sixth half adder output, and the seventh half adder output coupled to the first half adder output;
        a multiplexer having a first multiplexer input, a second multiplexer input, and a multiplexer output, the first multiplexer input coupled to the clear input and the second multiplexer input coupled to the first half adder output; and
        a flip-flop having a first flip-flop input, a second flip-flop input, and a flip-flop output, the first flip-flop input coupled to the clock input, the second flip-flop input coupled to the multiplexer output, and the flip-flop output is coupled to the counter output;
    a comparator having a first comparator input, a second comparator input, and a comparator output, wherein the first comparator input is coupled to the counter output; and
    a logic gate having a logic gate input and a logic gate output, wherein the logic gate input is coupled to the counter output.

2. The circuit of claim 1, wherein the logic gate is a first logic gate, the logic gate input is a first logic gate input, and the logic gate output is a first logic gate output, the circuit further comprising a second logic gate having a second logic gate input, a third logic gate input, and a second logic gate output, in which the second logic gate input is coupled to the first logic gate output.

3. The circuit of claim 2, further comprising a third logic gate having a fourth logic gate input and a third logic gate output, wherein the fourth logic gate input is coupled to the third logic gate input, and the third logic gate output is coupled to the clock input.

4. The circuit of claim 3, wherein the first logic gate is a NOR gate, the second logic gate is an AND gate, and the third logic gate is an inverter.

5. The circuit of claim 1, wherein the logic gate is a first logic gate, the logic gate input is a first logic gate input, and the logic gate output is a first logic gate output, the circuit further comprising:
- a second logic gate having a second logic gate input and a second logic gate output, wherein the second logic gate output is coupled to the clock input;
- a third logic gate having a third logic gate input and a third logic gate output, wherein the third logic gate input coupled to the first logic gate output; and
- a fourth logic gate having a fourth logic gate input, a fifth logic gate input, and a fourth logic gate output, wherein the fourth logic gate input is coupled to the third logic gate output, and the fifth logic gate input is coupled to the second logic gate input.

6. The circuit of claim 5, wherein the second logic gate is an inverter, the third logic gate is an inverter, and the fourth logic gate is an AND gate.

7. The circuit of claim 1, wherein the comparator comprises:
- a first XOR gate having a first XOR input, a second XOR input, and a first XOR output, wherein the first XOR input is coupled to the first comparator input, and the second XOR input is coupled to the second comparator input;
- a second XOR gate having a third XOR input, a fourth XOR input, and a second XOR output, wherein the third XOR input is coupled the first comparator input, and the fourth XOR input is coupled to the second comparator input;
- a third XOR gate having a fifth XOR input, a sixth XOR input, and a third XOR output, wherein the fifth XOR input is coupled to the first comparator input, and the sixth XOR input is coupled to the second comparator input;
- a fourth XOR gate having a seventh XOR input, an eighth XOR input, and a fourth XOR output, wherein the seventh XOR input is coupled to the first comparator input, and the eighth XOR input is coupled to the second comparator input; and
- an AND gate having a first AND input, a second AND input, a third AND input, a fourth AND input, and an AND output, wherein the first AND input is coupled to the first XOR output, the second AND input is coupled to the second XOR output, the third AND input is coupled to the third XOR output, the fourth AND input is coupled to the fourth XOR output, and the AND output is coupled to the comparator output.

8. A circuit comprising:
- a counter configured to produce a count signal responsive to a clock signal and a clear signal;
- a comparator configured to produce the clear signal by comparing the count signal to a phase selection signal;
- a first logic gate having a first logic output, wherein the first logic gate is configured to provide a logic output signal at the first logic output responsive to the count signal; and
- a second logic gate configured to provide a clock pulse responsive to the logic output signal and the clock signal.

9. The circuit of claim 8, wherein the first logic gate is a NOR gate and the second logic gate is an AND gate.

10. The circuit of claim 8, the circuit further comprising:
- an inverter having an inverter input and an inverter output, wherein the inverter input is coupled to the first logic output, and the inverter is configured to provide an inverted logic signal at the inverter output; and
- a third logic gate coupled to the inverter, wherein the third logic gate is configured to provide a clock output signal responsive to the inverted logic signal and the clock signal.

11. The circuit of claim 10, wherein the first logic gate is a NOR gate and the third logic gate is an AND gate.

12. The circuit of claim 8, wherein the comparator is configured to assert a resets signal as the clear signal in response to the count signal being equal to the phase selection signal.

13. A system comprising:
- an integrated device comprising:
  - a clock recovery circuit comprising:
    - a counter circuit having a clock input, a clear input, and a counter output;
    - a comparator having a first comparator input, a second comparator input, and a comparator output, wherein the first comparator input is coupled to the counter output; and
    - a logic gate having a logic gate input and a logic gate output, wherein the logic gate input is coupled to the counter output;
  - a direct current (DC)/DC converter coupled to the clock recovery circuit; and
  - an inductor coupled to the DC/DC converter.

14. The system of claim 13, wherein the logic gate is a first logic gate, the logic gate input is a first logic gate input, and the logic gate output is a first logic gate output, the clock recovery circuit further comprising:
- a second logic gate having a second logic gate input, a third logic gate input, and a second logic gate output, wherein the second logic gate input is coupled to the first logic gate output; and
- a third logic gate having a fourth logic gate input and a third logic gate output, wherein the fourth logic gate input is coupled to the third logic gate input and the third logic gate output is coupled to the clock input.

15. The system of claim 14, the clock recovery circuit further comprising:
- a fourth logic gate having a fifth logic gate input and a fourth logic gate output, wherein the fifth logic gate input is coupled to the first logic gate output; and
- a fifth logic gate having a sixth logic gate input, a seventh logic gate input, and a fifth logic gate output, wherein the sixth logic gate input is coupled to the fourth logic gate output, and the seventh logic gate input is coupled to the fourth logic gate input.

16. The system of claim 15, wherein the integrated device is a first integrated device, the clock recovery circuit is a first clock recovery circuit, the DC/DC converter is a first DC/DC converter, and the inductor is a first inductor, the system further comprising a second integrated device comprising:

a second clock recovery circuit having a clock recovery input, a first clock recovery output, and a second clock recovery output, wherein the clock recovery input is coupled to the fifth logic gate output;

a second DC/DC converter coupled to the second clock recovery circuit; and a second inductor coupled to the second DC/DC converter and to the first inductor.

17. The system of claim 15, wherein the first logic gate is a NOR gate, the second logic gate is an AND gate, the third logic gate is an inverter, the fourth logic gate is an inverter, and the fifth logic gate is an AND gate.

18. The system of claim 14, the integrated device further comprising a clock generator coupled to the clock recovery circuit.

* * * * *